(12) United States Patent
Kishi

(10) Patent No.: US 6,859,205 B1
(45) Date of Patent: Feb. 22, 2005

(54) APPARATUS AND METHOD FOR DRAWING LINES

(75) Inventor: Tetsuji Kishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 404 days.

(21) Appl. No.: 09/677,821

(22) Filed: Oct. 3, 2000

(30) Foreign Application Priority Data

Oct. 5, 1999 (JP) ............................................ 11-284031

(51) Int. Cl.⁷ ............................................. G06T 11/20
(52) U.S. Cl. .................... 345/443; 345/440; 345/440.1; 345/441
(58) Field of Search ............................... 345/443, 440, 345/440.1, 441

(56) References Cited

U.S. PATENT DOCUMENTS

| | | | |
|---|---|---|---|
| 5,167,015 A | 11/1992 | Bair et al. | |
| 5,214,754 A | 5/1993 | Okamoto et al. | |
| 5,594,848 A | * 1/1997 | Dao | ............................ 345/624 |
| 5,821,938 A | 10/1998 | Saito | |
| 5,841,442 A | 11/1998 | Einkauf et al. | |
| 5,969,699 A | * 10/1999 | Balram et al. | ................ 345/10 |

FOREIGN PATENT DOCUMENTS

| | | | |
|---|---|---|---|
| EP | 0 247 711 | 12/1987 | |
| EP | 0247711 | * 12/1987 | ............ G09G/1/10 |
| JP | 05061979 A | 3/1993 | |
| JP | 05346936 A | 12/1993 | |

OTHER PUBLICATIONS

R. Soisc & R. Riesenfeld, "Parallel Algorithms for Line Generation," *International Journal of Parallel Programming*, vol. 19, No. 5, Oct. 1990, New York, pp. 389–404.

J. Rankin, "Recursive Bisection Line Algorithm," *Computers and Graphics*, vol. 15, No. 1, 1999, pp. 1–8.

Japanese Patent Office Notice of Reasons for Rejection mailed Mar. 2, 2004 (with translation).

* cited by examiner

*Primary Examiner*—Matthew C. Bella
*Assistant Examiner*—Tam Tran
(74) *Attorney, Agent, or Firm*—McDermott Will & Emery LLP

(57) ABSTRACT

An inventive line-drawing apparatus draws a line that connects a start point to an end point. The start and end points are both presented on a display and represented by mutually different sets of coordinates. The apparatus includes first and second FIFO memories, an adder and a shifter. Each of the first and second FIFO memories accepts a plurality of input coordinate data and sequentially outputs one of these data after another on a first in, first out basis. The adder receives and adds together the respective coordinate data output from the first and second memories and outputs added data. And the shifter divides the added data by two and outputs divided data. The coordinate data output from the first and second memories are input to the first memory. The divided data is input from the shifter to the second memory. The line connecting the start and end points together is drawn on the display in accordance with the divided data output from the shifter.

12 Claims, 24 Drawing Sheets

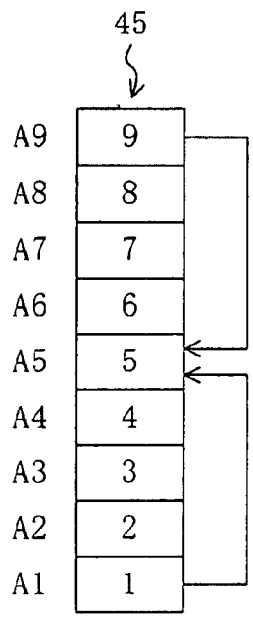
Fig. 14(a)
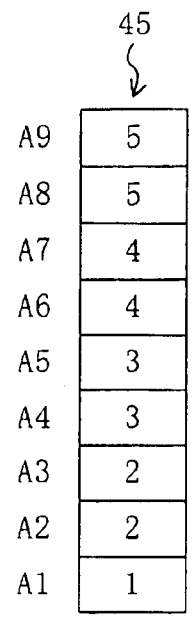
Fig. 14(c)
Fig. 14(b)
| ORDER IN WHICH MIDPOINT COORDINATES ARE CALCULATED |
1 : $(A5) = \dfrac{(A1)+(A9)}{2}$
2 : $(A3) = \dfrac{(A1)+(A5)}{2}$
3 : $(A2) = \dfrac{(A1)+(A3)}{2}$
4 : $(A4) = \dfrac{(A3)+(A5)}{2}$
5 : $(A7) = \dfrac{(A5)+(A9)}{2}$
6 : $(A6) = \dfrac{(A5)+(A7)}{2}$
7 : $(A8) = \dfrac{(A7)+(A9)}{2}$

DIVIDED INTO TWO

DIVIDED INTO FOUR

APPARATUS AND METHOD FOR DRAWING LINES

BACKGROUND OF THE INVENTION

The present invention generally relates to a graphics processor for drawing lines as a graphic image on a display device, for example, and more particularly relates to an apparatus that can draw relatively short lines in a shorter amount of time.

Thanks to remarkable progress of computer graphics technologies, the capabilities of graphics processors, such as the quantities of data processable per unit time, have tremendously improved. Under the circumstances such as these, the need for drawing an image at an even higher resolution goes on increasing day after day. Typical applications the computer graphics technologies have ever found include computer-aided design (CAD), computer-aided engineering (CAE) and computer games. Recently, however, those technologies have expanded their applications to presentation of maps on the display of a car navigation system using a global positioning system (GPS).

A car navigation system, in particular, often needs to present map information (e.g., roads, boundaries, etc. on the map) on the screen as a combination of many short lines, not just simple straight lines (or line segments). Also, the user's demand for accelerated line drawing by a graphics processor has been rising in the field of navigation systems. This is because he or she almost always wants to retrieve information about an area neighboring that currently presented on the screen as fast as possible.

As for the techniques of drawing lines by computer graphics technologies, see Yoshio Sato, "An Introduction to Graphics", ASCII Publisher, pp. 46–56, for example.

Hereinafter, a known line-drawing method will be described with reference to FIGS. 25 and 26.

FIG. 25 illustrates a basic procedure taken by the known line-drawing method. Suppose a start point 100 with coordinates (Xs, Ys) and an end point 101 with coordinates (Xe, Ye) are given on the screen. In this case, to draw a line connecting the start and end points 100 and 101 together, a (linear) slope parameter, representing the slope of the line, needs to be calculated from these coordinates as $|Ye-Ys|/|Xe-Xs|$. Actually though, the line is drawn as a group of line segments 102 with a unit length that are joined together between the start and end points 100 and 101.

FIG. 26 illustrates a typical flow of the known line-drawing process. As shown in FIG. 20, first, in Step S100, the directional attribute of a line is determined. Specifically, the shifting direction of the line is known from the signs of the differences between the X Coordinates and between the Y coordinates of the start and end points 100 and 101, i.e., (Xe−Xs) and (Ye−Ys). Next, in Step S101, the slope parameter of the line is obtained by dividing the absolute value of the difference between the Y coordinates by that of the difference between the X coordinates, i.e., $|Ye-Ys|/|Xe-Xs|$. Then, in Step S102, it is determined whether or not the far end of the line being drawn has reached the end point 101. If the answer is NO, then the slope parameters obtained are sequentially added together from the start point 100 in the next Step S103.

As described above, in presenting detailed information about roads as a map on a car navigation system, for example, it is necessary to draw many short lines within a predetermined amount of time. However, the conventional line-drawing method needs to perform division operations for generating slope parameters as shown in FIG. 26. As is well known in the art, the division operations require high computational costs in the field of digital computations. That is to say, the hardware cost and the time for performing those operations are several times greater than addition operations. Thus, it is difficult for a car navigation system, which usually presents roads and so on using short lines, to draw those lines at sufficiently high speeds.

SUMMARY OF THE INVENTION

It is therefore an object of the present invention to draw lines (or short lines, in particular) at high speeds using a simple configuration.

To achieve this object, the inventive line-drawing apparatus presents a midpoint between the start and end points of a line by generating the coordinates of the point. Then, the apparatus sequentially presents other midpoints by generating their coordinates such that each midpoint is located between the midpoint previously generated and one of the other points adjacent to the midpoint.

Specifically, a first inventive line-drawing apparatus is adapted to draw a line connecting a start point to an end point. The start and end points are represented by mutually different sets of coordinates. The apparatus includes midpoint coordinate generating means for generating coordinates for first, second and third midpoints. The first midpoint is located in the middle of a line segment connecting the start and end points together. The second midpoint is located in the middle of a line segment connecting the start point and the first midpoint together. And the third midpoint is located in the middle of a line segment connecting the end point and the first midpoint together. The apparatus further includes display means for presenting the start point, the first, second and third midpoints and the end point thereon.

In the first line-drawing apparatus, first, the midpoint coordinate generating means generates coordinates for a first midpoint located in the middle of a line segment connecting start and end points together. And then the generating means sequentially generates coordinates for other midpoints, each located in the middle of a line segment connecting two adjacent points together. Thus, in calculating a linear parameter representing the slope of the line, there is no need to perform a division operation using the difference between the X coordinates of the start and end points as a denominator. That is to say, since virtually no dividers are needed anymore, the throughput improves particularly when many short lines should be drawn. In addition, since the divide-by-two operation for obtaining each midpoint may be performed just by shifting right by one bit as for a binary number, the configuration of the apparatus can be simplified and the cost thereof can be cut down.

In one embodiment of the present invention, the midpoint coordinate generating means further generates coordinates for other midpoints, each being located in the middle of a line segment ending at two adjacent ones of the points. In such an embodiment, even if the line to be drawn is relatively long, the line still can be drawn with higher precision.

In another embodiment of the present invention, the line connecting the start and end points together is preferably divided into a number $2^n$ of line segments, where n is an integer equal to or greater than zero. And each said line segment is preferably further divided by two with the line segment regarded as ending at a new pair of start and end points. In such an embodiment, even if the line connecting the start and end points together is relatively long, that long line can be drawn by dividing the long line into multiple short lines in advance and there is no need to use the linear parameters unlike the conventional method. In addition, since this apparatus can be used recursively, the apparatus can have its configuration simplified.

In this particular embodiment, at least one midpoint is obtained by dividing the line connecting the start and end points together into a number $2^n$ of line segments, where n is an integer greater than zero. Each said midpoint obtained is located in the middle of a line segment connecting two of the other points, where one of the two points is located closer to the start point while the other is located closer to the end point.

A second inventive line-drawing apparatus is also adapted to draw a line connecting a start point to an end point. The start and end points are both presented on display means and represented by mutually different sets of coordinates. The apparatus includes: first and second data storage means, each accepting a plurality of input coordinate data and sequentially outputting one item of these data after another on a first in, first out basis; adding means for receiving and adding together the respective coordinate data output from the first and second data storage means and outputting added data; and divide-by-two means for dividing the added data by two and outputting divided data. The coordinate data output from the first and second data storage means are input to the first data storage means. The divided data is input from the divide-by-two means to the second storage means. And the line connecting the start and end points together is drawn on the display means in accordance with the divided data output from the divide-by-two means.

In the second line-drawing apparatus, coordinate data, representing the start and end points, are output and stored on the first and second data storage means concurrently. Next, the output data of the first and second data storage means, i.e., the coordinate data representing the start and end points, are output to the adding means. At the same time, the coordinate data representing the start and end points are stored on the first data storage means, while the divided coordinate data, representing the first midpoint, is stored on the second data storage means. Since these data storage means are FIFOs, the first and second data storage means will next output the coordinate data representing the start or end point and the coordinate data representing the first midpoint, respectively. Thus, if these coordinate data output are added together and the sum is divided by two, then the coordinates for the second or third midpoint are generated. In this manner, the second inventive line-drawing apparatus performs the same operation as the first inventive line-drawing apparatus.

In one embodiment of the present invention, the divide-by-two means is preferably a shifter that is so interconnected as to shift the added data to the right by one bit. In such an embodiment, the divide-by-two means is implementable as a shifter (e.g., a barrel shifter) that can operate at a high speed using a simple configuration. Thus, the inventive apparatus can consist of relatively simple hardware resources including the adding means as primary components.

In another embodiment of the present invention, the second apparatus may further include iteration control means for regulating the number of times the output data is fed back to the first and second storage means. The iteration control means may include: a longer side calculator/selector for calculating respective absolute values of a difference between X coordinates and a difference between Y coordinates of the start and end points and for outputting one of these two differences that has the greater absolute value; and a number-of-times comparator for determining, by the absolute value, the number of times the output should be fed back. In such an embodiment, the longer side calculator/selector selects either the difference between the X coordinates or the difference between the Y coordinates that has the greater absolute value for the start and end points. Accordingly, the number of mid-points formed between the start and end points is controllable depending on the absolute values of the differences between the X coordinates and between the Y coordinates, thus increasing the line-drawing precision. In addition, since the number-of-times comparator determines the required number of times of feedback by the difference with the greater absolute value, the line-drawing process can be finished within a predetermined amount of time.

In still another embodiment, the second apparatus may further include: first and second color data storage means, each accepting a plurality of input color data and sequentially outputting one of the data after another on a first in, first out basis; color data adding means for receiving and adding together the respective color data output from the first and second color data storage means and outputting added color data; and color data divide-by-two means for dividing the added color data by two and outputting divided color data. The color data, which are output from the first and second color data storage means and correspond to the start and end points, respectively, are input to the first color data storage means. The divided color data, output from the color data divide-by-two means, is input to the second color data storage means. And the color of the line connecting the start and end points together may be determined in accordance with the divided color data. Generally speaking, color information is also processed digitally by a computer. Thus, in this embodiment, the added color data is also divided by two, while the line connecting the start and end points together is being drawn. As a result, a color-interpolated, graded line can be drawn within a period of time required by the conventional division operation.

In an alternate embodiment, the second line-drawing apparatus may further include; first and second brightness data storage means, each accepting a plurality of input brightness data and sequentially outputting one of the data after another on a first in, first out basis; brightness data adding means for receiving and adding together the respective brightness data output from the first and second brightness data storage means and outputting added brightness data; and brightness data divide-by-two means for dividing the added brightness data by two and outputting divided brightness data. The brightness data, which are output from the first and second brightness data storage means and correspond to the start and end points, respectively, are input to the first brightness data storage means. The divided brightness data, output from the brightness data divide-by-two means, is input to the second brightness data storage means. And the brightness of the line connecting the start and end points together may be determined in accordance with the divided brightness data. Generally speaking, brightness information is also processed digitally by a computer. Thus, in this embodiment, the added brightness data is also divided by two, while the line connecting the start and end points together is being drawn. As a result, a brightness-interpolated, graded line can be drawn within a period of time required by the conventional division operation.

In yet another embodiment, the second line-drawing apparatus may further include: linear parameter calculating means for calculating and outputting a linear parameter representing a slope of the line connecting the start and end points together; first selecting means for receiving the linear parameter and the output data of the first data storage means and selectively outputting either the parameter or the output data of the first data storage means to the adding means; and second selecting means for receiving the divided data and the output data of the second data storage means and selectively outputting either the divided data or the output data of the second data storage means to the adding means. In general, when a relatively long line should be drawn between start and end points, that line could be drawn faster by the conventional method, in which the line is sequentially drawn to the end point while calculating linear parameters, than by the inventive method, in which the line segments are drawn while obtaining multiple midpoints. In this embodiment, however, the apparatus includes the linear parameter calculating means for calculating and outputting a linear parameter representing the slope of the line connecting the start and end points together. Thus, even in the situation described above, if the FIFO-type data storage means are disabled by the first and second selecting means to enable the output of the linear parameter calculating means, the adding means can be shared. Accordingly, in drawing short lines, a high throughput is realizable without using the conventional dividers. On the other hand, in drawing long lines, which could not be drawn at a high throughput by the short line drawing method, the configuration of the apparatus can be simplified by partially sharing the hardware.

A third inventive line-drawing apparatus is also adapted to draw a line connecting a start point to an end point. The start and end points are both presented on display means and both represented by mutually different sets of coordinates. The apparatus includes: data storage means with data storage areas on which multiple coordinate data are storable, the coordinate data including first and second coordinate data of the line connecting the start and end points together; adding means for adding together the first and second coordinate data and outputting added data; and divide-by-two means for dividing the added data by two and outputting divided data. The divided data is stored as third coordinate data on a predetermined one of the data storage areas.

In the third apparatus, data storage means includes data storage areas, on which multiple coordinate data, including first and second coordinate data of a line connecting start and end points together, are storable. Accordingly, the number of midpoints to be generated is automatically determined by the number of the data storage areas (i.e., capacity). As a result, the procedure of computations is simplified and controllable more easily.

In one embodiment of the present invention, the adding and divide-by-two means repeatedly perform the addition and the divide-by-two operation for multiple line segments a number of times determined by the number of the data storage areas. Each said line segment ends at two adjacent ones of midpoints that correspond to the respective coordinate data. And results of the addition and the divide-by-two operation are stored on respectively predetermined ones of the data storage areas. In such an embodiment, even if a line segment to be drawn is relatively long, the line segment can be drawn with higher precision.

An inventive line-drawing method is adapted to draw a line connecting a start point to an end point using a line-drawing apparatus. The apparatus includes: display means; first and second data storage means of a first in, first out type; adding means for receiving outputs of the first and second data storage means; and divide-by-two means for dividing an output of the adding means by two. The start and end points are both presented on the display means and represented by mutually different sets of coordinates. The method includes the steps of: a) outputting start and end point coordinate data, which represent the start and end points, respectively, to the display means; b) storing the start and end point coordinate data on the first and second data storage means, respectively; c) outputting the start point coordinate data from the first data storage means to the adding means and storing the start point coordinate data back to the first storage means concurrently; d) outputting the end point coordinate data from the second data storage means to the adding means and storing the end point coordinate data on the first storage means concurrently; e) outputting a sum of the start and end point coordinate data from the adding means to the divide-by-two means; and f) providing output data of the divide-by-two means to the display means and storing the output data of the divide-by-two means on the second data storage means concurrently such that the output data of the divide-by-two means corresponds to the start and end point coordinate data stored in the steps c) and d).

According to the inventive line-drawing method, short lines can be drawn easily using the second inventive line-drawing apparatus.

BRIEF DESCRIPTION OF THE DRAWINGS

FIG. 8(a) illustrates coordinate data for start and end points;

FIG. 8(b) illustrates coordinate data for a first mid-point located between the start and end points;

FIG. 8(c) illustrates coordinate data for second and third midpoints; and

FIG. 8(d) illustrates the coordinate data defined for the five pixels.

FIGS. 14(a) through 14(c) illustrate a method using a fixed memory for a line-drawing apparatus according to a modified example of the first embodiment:

FIG. 14(a) is a schematic representation illustrating a fixed memory that stores data for nine pixels thereon;

FIG. 14(b) illustrates the order in which coordinates of respective midpoints should be calculated and the locations where those midpoint coordinate data should be stored; and FIG. 14(c) is a schematic representation illustrating a fixed memory that stores data for five pixels thereon.

FIG. 23(a) illustrates a long line to be drawn;

FIG. 23(b) illustrates two short lines obtained by dividing the long line shown in FIG. 23(a) into-two; and FIG. 23(c) illustrates four short lines obtained by further dividing each of the short lines shown in FIG. 23(b) into two.

DESCRIPTION OF THE PREFERRED EMBODIMENTS

Embodiment 1

Hereinafter, a first embodiment of the present invention will be described with reference to the accompanying drawings.

Figure 1:
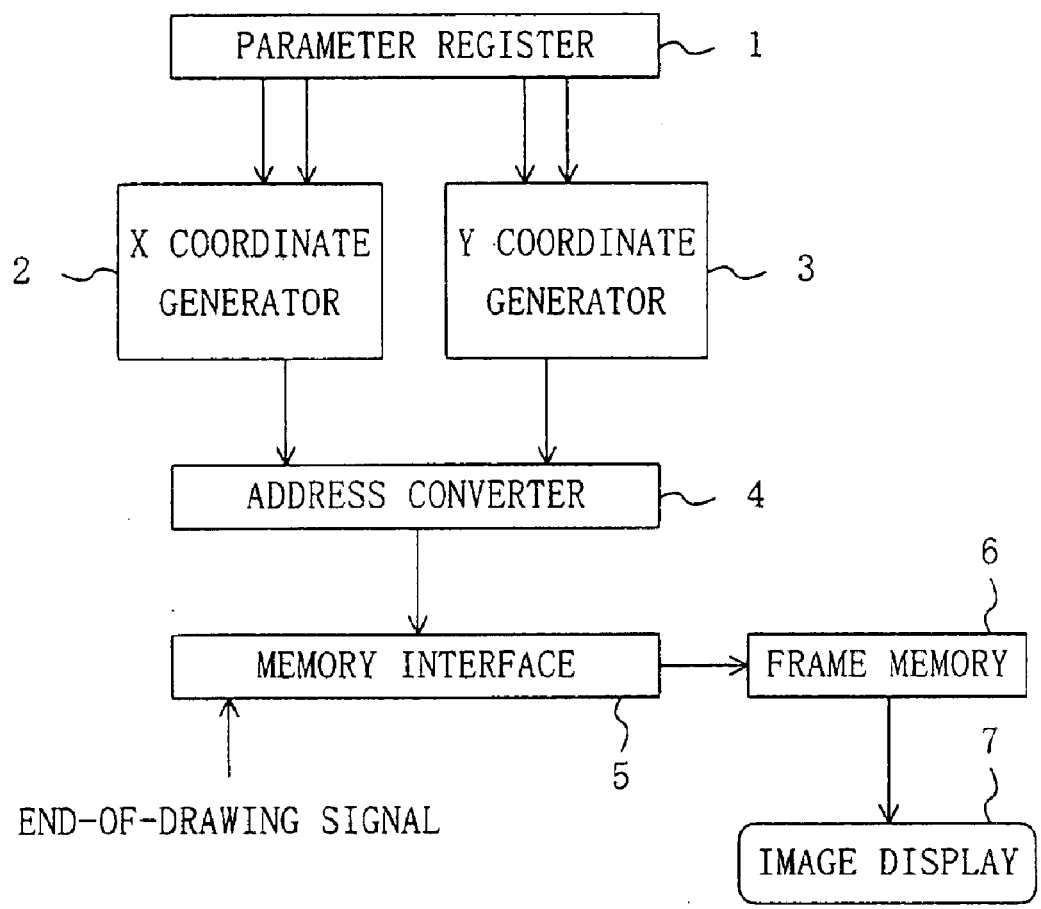
FIG. 1 is a schematic block diagram illustrating a line-drawing apparatus according to a first embodiment of the present invention.

FIG. 1 illustrates a configuration for a line-drawing apparatus of the first embodiment. As shown in FIG. 1, the line-drawing apparatus includes parameter register 1, X and Y coordinate generators 2 and 3, address converter 4, memory interface 5, frame memory 6 and image display 7. Coordinate data, representing an image to be drawn, is temporarily stored on the parameter register 1, X and Y coordinates, included in the coordinate data, are generated by the X and Y coordinate generators 2 and 3, respectively. The address converter 4 converts the two-dimensional coordinate data, generated by the X and Y coordinate generators 2 and 3, into one-dimensional coordinate data, which is passed to, and stored on, the frame memory 6 for storing image frames via the memory interface 5. Then, the coordinate data is eventually presented on the image display 7 such as a liquid crystal display panel or a CRT. On receiving an end-of-drawing signal, the memory interface 5 stops outputting the coordinate data to the frame memory 6.

Figure 2:
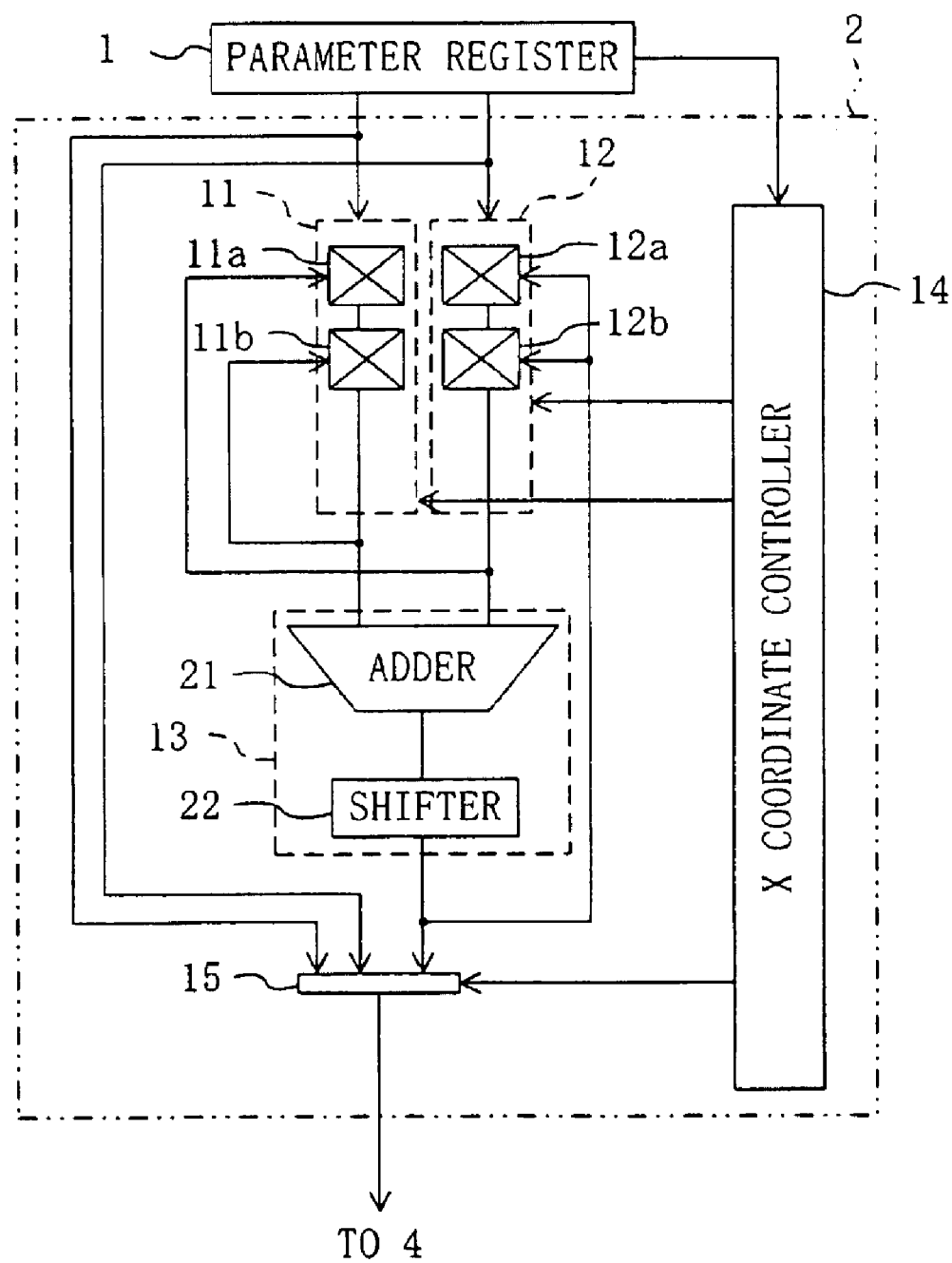
FIG. 2 is a block diagram illustrating the details of an X coordinate generator for the line-drawing apparatus of the first embodiment.

FIG. 2 illustrates the details of the X coordinate generator 2 shown in FIG. 1. Although not shown, the Y coordinate generator 3 also has a similar configuration to that of the X coordinate generator 2. As shown in FIG. 2, the X coordinate generator 2 includes first and second FIFO memories 11 and 12, X coordinate calculator 13, X coordinate controller 14 and selector 15. The first and second FIFO memories 11 and 12 may receive the X coordinates of the start and end point coordinate data, respectively, from the parameter register 1 and store them thereon. The X coordinate calculator 13 receives and adds together the output data of the first and second FIFO memories 11 and 12, divides the sum by two and then outputs the quotient. The X coordinate controller 14 is an exemplary iteration control means for controlling the iterative operation of the first and second FIFO memories 11 and 12, for example, as defined in the appended claims. The selector 15 receives the two output data of the parameter register 1 and the output data of the X coordinate calculator 13 and selectively outputs one of these three data in response to a select signal supplied from the X coordinate controller 14.

The first FIFO memory 11 includes first and second memory cells 11a and 11b. One of the two output data of the parameter register 1 and the output data of the second FIFO memory 12 are input to the first memory cell 11a. The output data of the first memory cell 11a and that of the first FIFO memory 11 are input to the second memory cell 11b.

The second FIFO memory 12 also includes first and second memory cells 12a and 12b. The other output data of the parameter register 1 and the output data of the X coordinate calculator 13 are input to the first memory cell 12a. The output data of the first memory cell 12a and that of the X coordinate calculator 13 are input to the second memory cell 12b. It should be noted that the same operation is executable even if the first and second FIFO memories 11 and 12 have their positions interchanged horizontally.

The X coordinate calculator 13 includes an adder 21 and a shifter 22. The adder 21 receives and adds together the output data of the first and second FIFO memories 11 and 12. The shifter 22 is an exemplary divide-by-two means for dividing the sum by two as defined in the appended claims.

Figure 3:
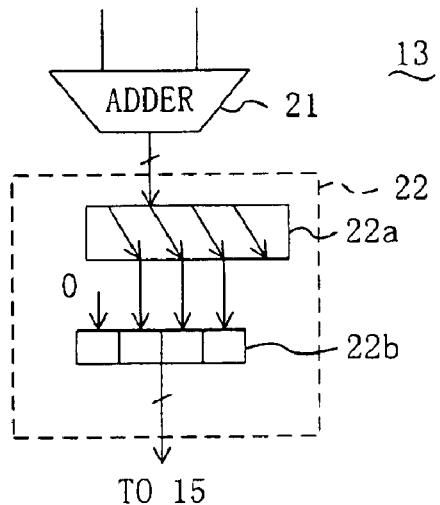
FIG. 3 is a block diagram illustrating the details of a shifter for the line-drawing apparatus of the first embodiment.

In the illustrated embodiment, the shifter 22 preferably has the configuration shown in FIG. 3. Specifically, the shifter 22 preferably includes a one-bit line shifter 22a and a data latch 22b. The one-bit line shifter 22a is a barrel shifter, which has been so interconnected as to be shifted right by one bit such that the input data can be shifted to the right by one bit. The data latch 22b latches the output values of the one-bit line shifter 22a bit by bit and output them as serial data. In such an embodiment, the circuit configuration of the shifter 22 can be simplified and the input can be divided by two at a higher speed.

Figure 4:
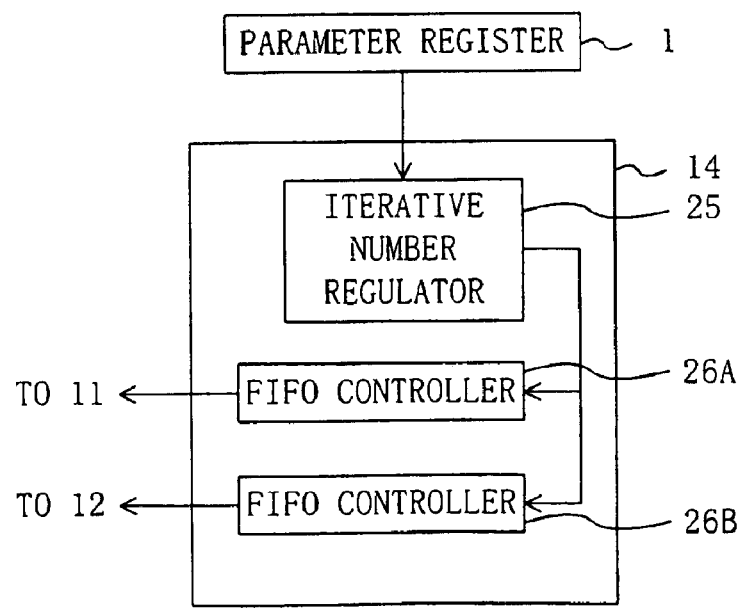
FIG. 4 is a block diagram illustrating the details of an X coordinate controller for the line-drawing apparatus of the first embodiment.

FIG. 4 illustrates the details of the X coordinate controller 14. In FIG. 4, the X coordinate controller 14 includes iterative number regulator 25 and first and second FIFO controllers 26A and 26B. The iterative number regulator 25 determines how many times the output data should be fed back to the first and second FIFO memories 11 and 12, i.e., the number of times the operation of obtaining a midpoint should be performed. Following the instruction issued from the iterative number regulator 25, the first and second FIFO controllers 26A and 26B control the input and output of data to/from the first and second FIFO memories 11 and 12, respectively.

Figure 5:
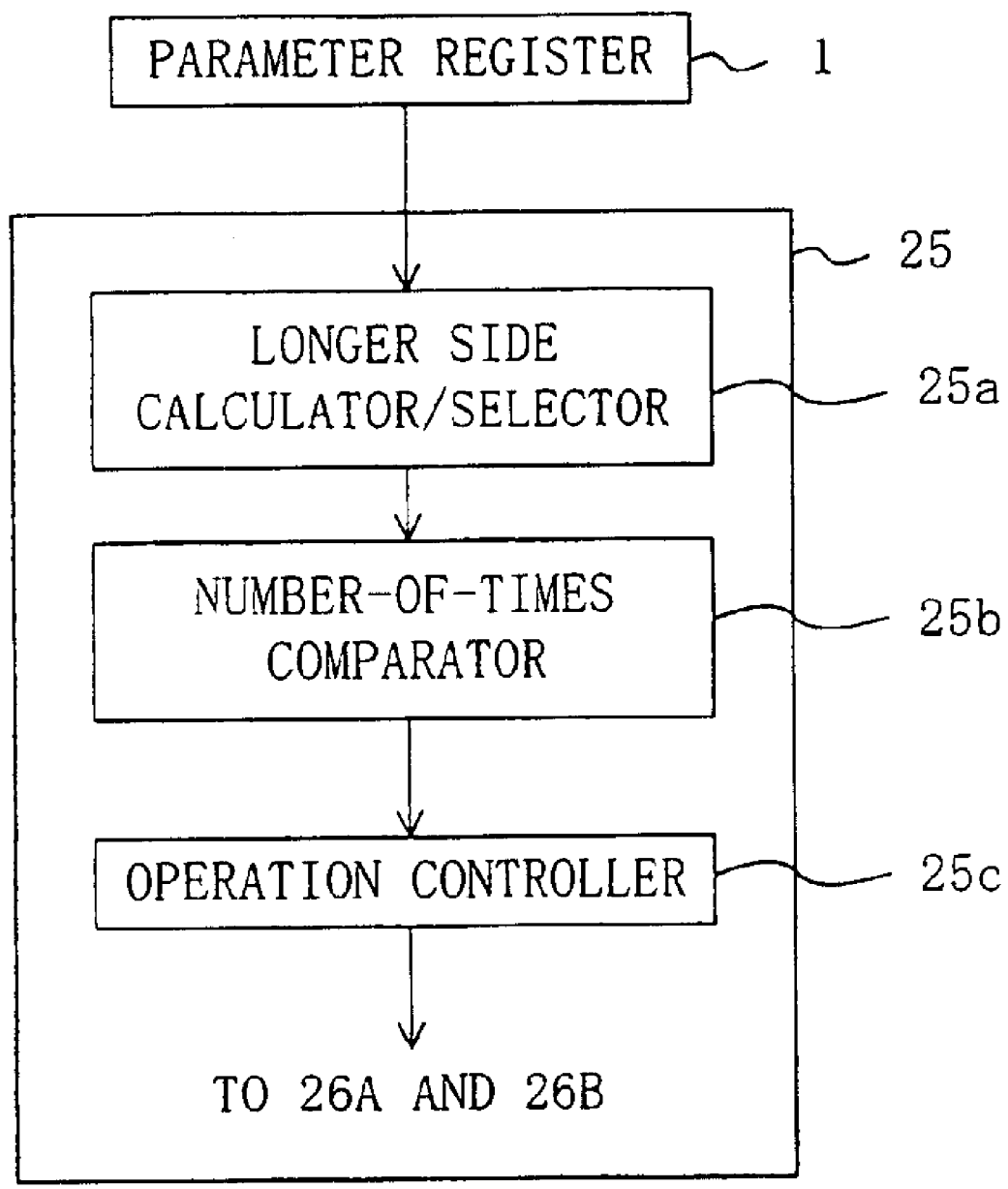
FIG. 5 is a block diagram illustrating the details of an iterative number regulator for the line-drawing apparatus of the first embodiment.

FIG. 5 illustrates the details of the iterative number regulator 25. As shown in FIG. 5, the iterative number regulator 25 includes longer side calculator/selector 25a, number-of-times comparator 25b and operation controller 25c. Receiving the start and end point coordinates (Xs, Ys) and (Xe, Ye) of a line to be drawn from the parameter register 1, the longer side calculator/selector 25a obtains the absolute values of the difference between the X coordinates and the difference between the Y coordinates of these two points, i.e., |Xe−Xs| and |Ye−Ys|, and outputs one of these two differences with the greater absolute value. That is to say, the longer side calculator/selector 25a selectively outputs the data corresponding to the longer side. The number-of-times comparator 25b determines, by the value of the longer side, the number of times the operation should be performed and outputs the number. In response, the operation controller to 25c gets a predetermined operation executed by the X coordinate calculator 13 the given number of times.

Figure 6:
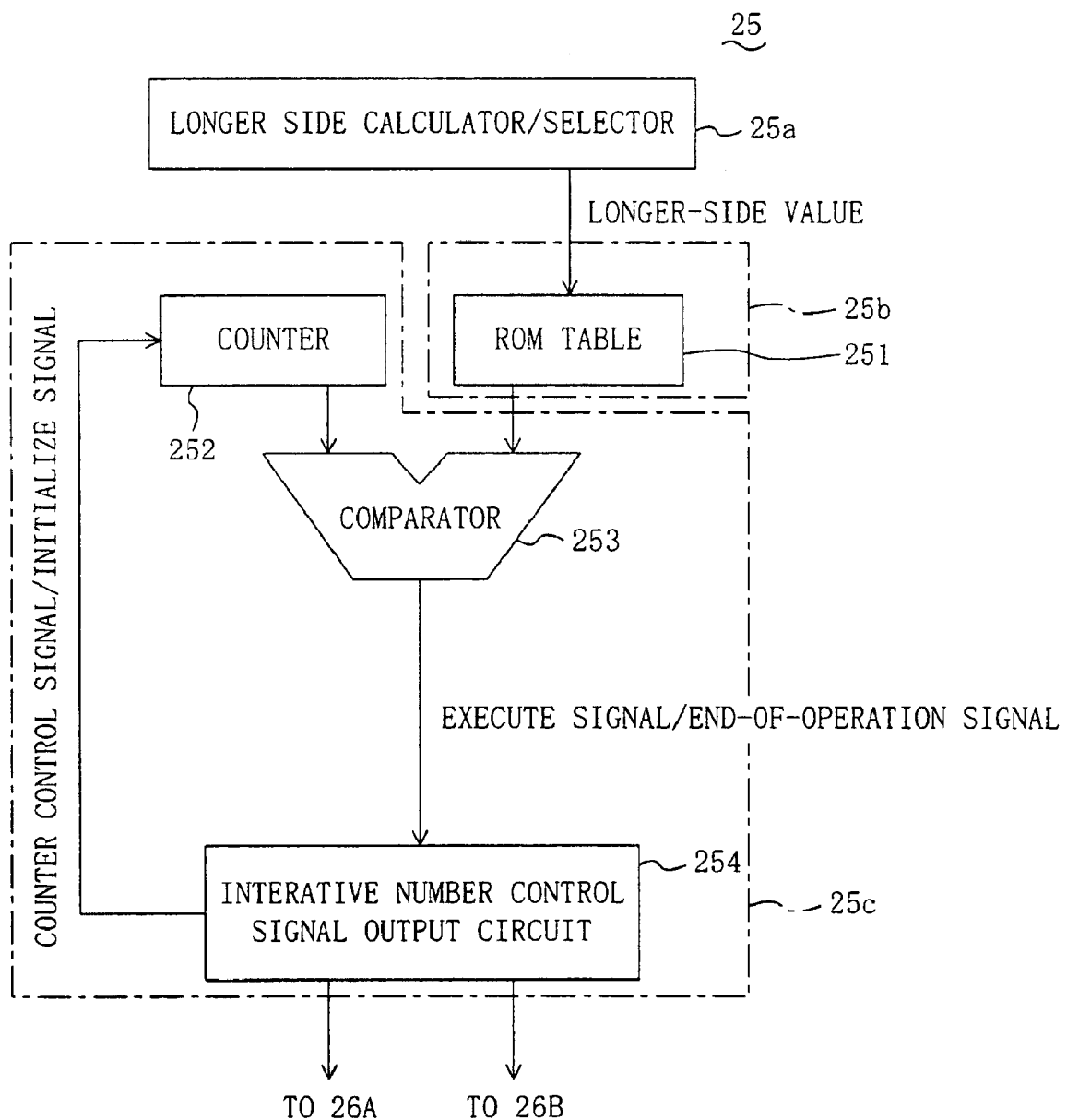
FIG. 6 is a block diagram illustrating the details of a number-of-times comparator for the line-drawing apparatus of the first embodiment.

FIG. 6 illustrates an exemplary configuration for the number-of-times comparator 25b and operation controller 25c. As shown in FIG. 6, the number-of-times comparator 25b includes a ROM table 251. The operation controller 25c includes counter 252, comparator 253 and iterative number control signal output circuit 254. The value of the longer side and the predetermined number of times the operation should be performed (which number has been determined by the longer-side value) are stored on the ROM table 251. The counter 252 counts the number of times the operation has actually been performed. The comparator 253 compares the predetermined number of times, which has been read out from the ROM table 251, to the count output from the counter 252. If the count is still less than the predetermined number, then the comparator 253 outputs an execute signal. Alternatively, if the count is already equal to or greater than the predetermined number, then the comparator 253 outputs an end-of-operation signal.

In response to the execute signal, the iterative number control signal output circuit 254 outputs a counter control signal to the counter 252 to instruct the counter 252 to keep counting, and also outputs the execute signal to the first and second FIFO controllers 26A and 26B. On receiving the end-of-operation signal, the iterative number control signal output circuit 254 outputs an initialize signal to the counter 252 to instruct the counter 252 to reset the count and also outputs the end-of-operation signal to the first and second FIFO controllers 26A and 26B.

The ROM table 251 does not have to be a table on a memory area, but may be a logic circuit that receives the longer-side value and outputs the number of times determined by the longer-side value.

In the illustrated embodiment, the number of memory cells in each of the FIFO memories 11 and 12 (which will be herein referred to as the "number of FIFO stages") is four. Hereinafter, a relationship between the number of FIFO stages and the number of midpoints including the start and end points will be described. Also, each midpoint of a line, which is represented by X and Y coordinates, will be herein called a "line point". That is to say, the "longer-side value" is the number of line points that together make the line.

The following Table 1 illustrates the contents of an iterative number determination table showing the relationships among the number of FIFO stages, the longer-side value and the number of times the operation should be performed repeatedly:

TABLE 1

| Index (Id) | Number of FIFO Stages ($2^{id+1}$) | Longer-side Value (n = $2^{(id+1)}$ + 1) | Number of Times of Operation (n − 2) |
|---|---|---|---|
| 0 | 2 | 3 | 1 |
| 1 | 4 | 5 | 3 |
| 2 | 8 | 9 | 7 |
| 3 | 16 | 17 | 15 |
| 4 | 32 | 33 | 31 |
| 5 | 64 | 65 | 63 |

Figure 7:
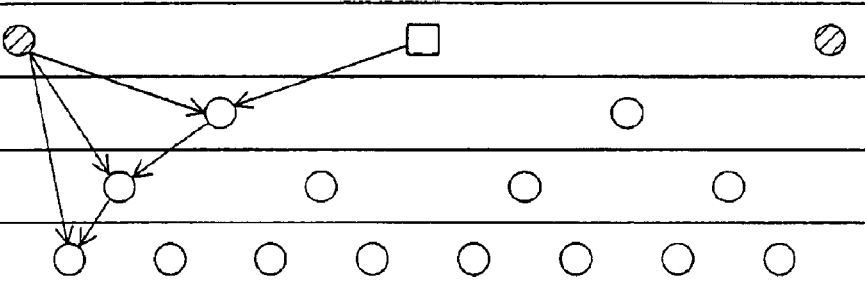
FIG. 7 is a schematic representation illustrating relationships between the number of stages in an FIFO memory and the value of a longer side to be drawn.

FIG. 7 schematically illustrates how the value of the longer side to be drawn increases with the increase in number of FIFO stages. The following Table 2 illustrates an exemplary iterative number determination table (i.e., example of the ROM table 251) used to determine, by the longer-side value output from the longer side calculator/selector 25a, how many times the operation should be performed repeatedly for an FIFO memory with four stages.

TABLE 2

| Longer-Side Value | Number of times of Operation |
|---|---|
| 1(0001) | 1 |
| 2(0010) | 1 |
| 3(0011) | 1 |
| 4(0100) | 3 |
| 5(0101) | 3 |
| 6(0110) | 7 |
| 7(0111) | 7 |
| 8(1000) | 7 |
| 9(1001) | 7 |

As can be seen from Table 1, the longer-side value or the number of times of operation, which is a function of the number ($2^{id+1}$) of FIFO stages, can be represented as a general formula.

Figure 8A:
FIGS. 8(a) through 8(d) are schematic representations illustrating how the line-drawing apparatus of the first embodiment generates coordinate data for a line connecting five pixels together.
Figure 8B:
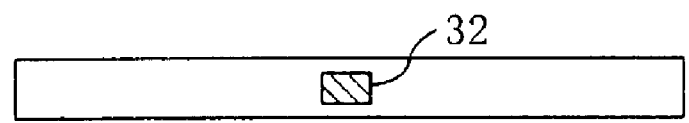
Figure 8C:
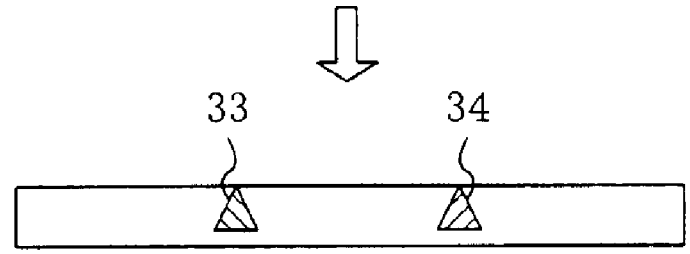
Figure 8D:
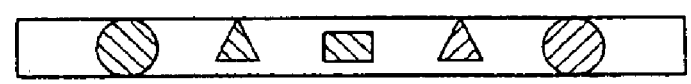

Hereinafter, it will be described with reference to the accompanying drawings how the line-drawing apparatus with such a configuration operates. Although the operation of the X coordinate generator 2 will be detailed in the following description, the same statement is applicable to the Y coordinate generator 3. FIGS. 8(a) through 8(d) schematically illustrate how to generate the coordinates for start point, end point and other midpoints. In FIG. 8(a), the start and end point coordinate data are identified by 30 and 31, respectively. In FIG. 8(b), first midpoint coordinate data 32 represents a midpoint of a line segment connecting the start and end points that are represented by the coordinate data 30 and 31, respectively. In FIG. 8(c), second mid-point coordinate data 33 represents a midpoint of a line segment connecting the start point and the first midpoint that are represented by the coordinate data 30 and 32, respectively. Also, third midpoint coordinate data 34 represents a midpoint of a line segment connecting the end point and the first midpoint that are represented by the coordinate data 31 and 32, respectively. And FIG. 8(d) illustrates the coordinate data finally defined for these five pixels. As used herein, the "pixel" refers to a point essential for a line to be drawn.

Figure 9:
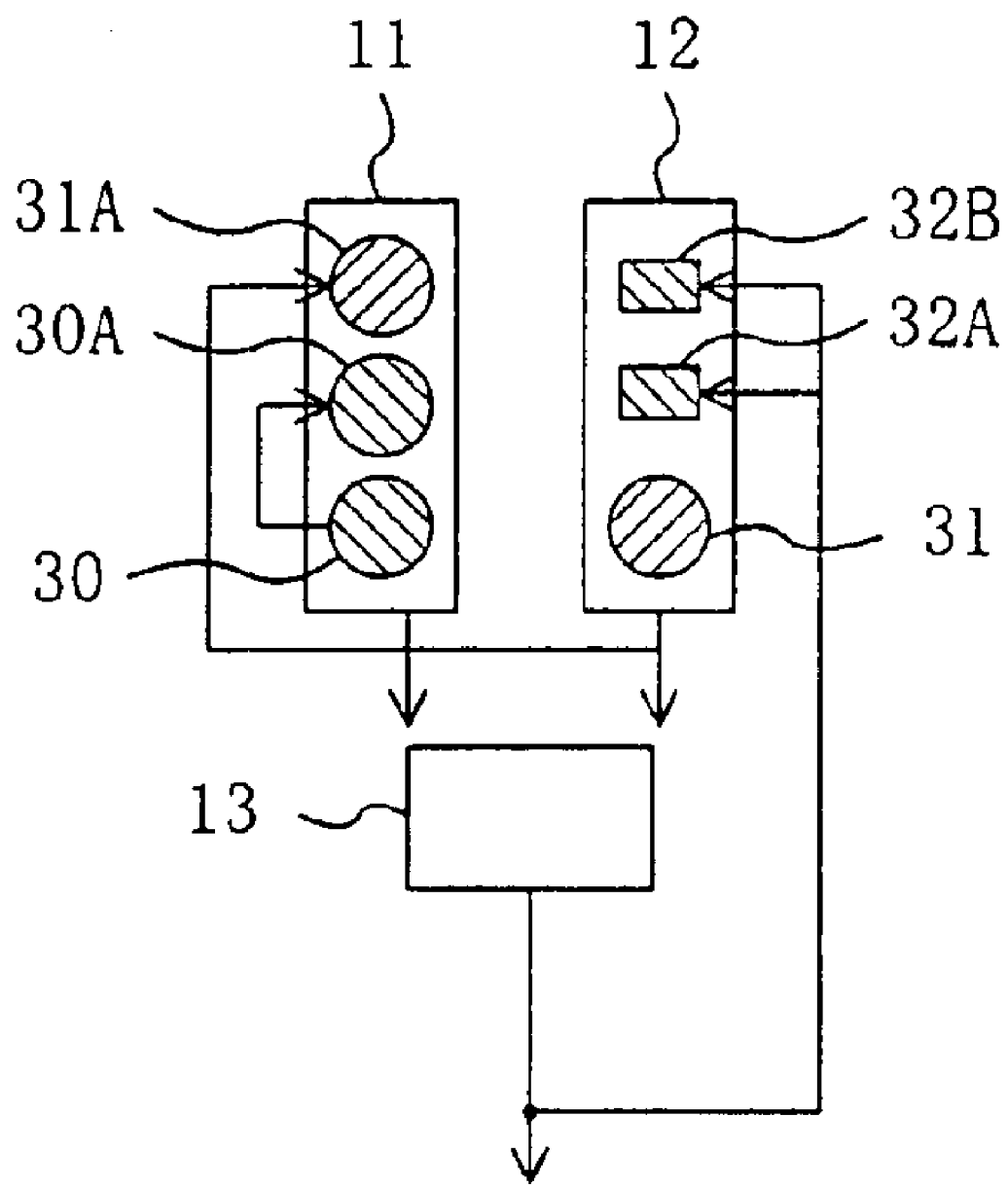
FIG. 9 is a schematic representation illustrating how the coordinate data are stored on the FIFO memory of the jag line-drawing apparatus of the first embodiment.

FIG. 9 schematically illustrates how the coordinate data 30 through 34 are stored on the first and second FIFO memories 11 and 12. In FIG. 9, the same components as those illustrated in FIG. 2 will be identified by the same reference numerals and the description thereof will be omitted herein.

First, as shown in FIGS. 2 and 9, the coordinate data 30 and 31 for the start and end points to be drawn with respective coordinates (Xs, Ys) and (xe, Ye) are input to, and stored on, the parameter register 1.

Next, Xs data, i.e., the X coordinate of the start point, is input from the parameter register 1 to the first FIFO memory 11 and stored on the memory 11. At the same time, the X coordinate controller 14 instructs the selector 15 to output the Xs data to the address converter 4 shown in FIG. 1. On the other hand, Xe data, i.e., the X coordinate of the end point, is input to, and stored on, the second FIFO memory 12, while the X coordinate controller 14 instructs the selector 15 to output the Xe data to the address converter 4 along with the Xs data. As a result, the start and end point coordinate data 30 and 31 shown in FIG. 8(a) are generated.

Then, the start and end point coordinate data 30 and 31 are respectively input from the first and second FIFO memories 11 and 12 to the X coordinate calculator 13. At the same time, the start point coordinate data 30, which is output from the first FIFO memory 11, is input again as data 30A to the first FIFO memory 11 as shown in FIG. 9. Thereafter, the end point coordinate data 31, which is output from the second FIFO memory 12, is input again as data 31A to the first FIFO memory 11. In this case, although these data are identified by different reference numerals 30A and 31A for illustrative purposes, these data have the same data values as the start and end point coordinate data 30 and 31, respectively. The same statement is applicable to data 32A and 32B to be described below.

The X coordinate calculator 13 adds together the start and end point coordinate data 30 and 31 and divides the sum by two, thereby outputting first midpoint coordinate data 32. At the same time, the first midpoint coordinate data 32 is input again to the two memory cells in the second FIFO memory 12 and stored thereon as data 32A and 32B. As a result, the first midpoint coordinate data 32 shown in FIG. 8(b) is generated.

Subsequently, as shown in FIG. 9, the start point coordinate data 30A and the first midpoint coordinate data 32A are respectively input from the first and second FIFO memories 11 and 12 to the X coordinate calculator 13. As a result, the second midpoint coordinate data 33 shown in FIG. 8(c) is generated.

Next, the end point coordinate data 31A and the first midpoint coordinate data 32B are respectively input from the first and second FIFO memories 11 and 12 to the X coordinate calculator 13. As a result, the third midpoint coordinate data 34 shown in FIG. 8(c) is generated. In this manner, as for five line points (or pixels), the X coordinate calculator 13 has to perform the add-and-divide-by-two operation three times.

Then, the address converter 4 converts the two-dimensional coordinates, consisting of the X and Y coordinates output from the X and Y coordinate generators 2 and 3, respectively, into one-dimensional coordinates as shown in FIG. 1. These one-dimensional coordinates are written as a frame image on the frame memory 6 by way of the memory interface 5. And the image is eventually presented on the image display 7.

Hereinafter, a specific configuration for the first and second FIFO memories 11 and 12 and a method of inputting and outputting data thereto/therefrom will be described.

Figure 10A:
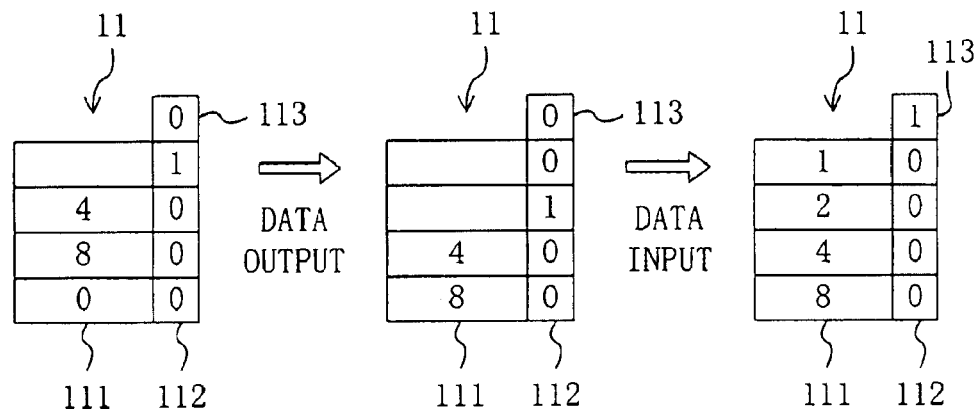
FIG. 10(a) is a schematic representation illustrating how data is input and output to/from a four-stage FIFO memory for the line-drawing apparatus of the first embodiment.

FIG. 10(a) schematically illustrates the first FIFO memory 11 with four FIFO stages. The second FIFO memory 12 may also have a configuration similar to that illustrated in FIG. 10(a) for the first FIFO memory 11. The number of FIFO stages should be determined in advance by the longer-side value of a line to be drawn by the line-drawing apparatus. For example., as shown in Table 1, if the line has a longer-side value of 5, then each FIFO memory should have four stages. And if the line has a longer-side value of 9, then each FIFO memory should have eight stages.

The first FIFO memory 11 preferably has the configuration shown in FIG. 10(a). Specifically, the first FIFO memory 11 includes data storage section 111 and end mark storage section 112. The data storage section 111 has memory areas with a width of at least 8 bits, while the end mark storage section 112 has memory areas with a width of 1 bit. The fifth stage of the end mark storage section 112 is an overflow section 113. Data input to the data storage section 111 is stored on a vacant area adjacent to the area where valid data has already been stored. On the other hand, data, which is output first from the data storage section 111, is on the first one of the stages where valid data have been stored.

In the FIFO memory 11 on the left-hand side of FIG. 10(a), data "0", "8" and "4" are respectively stored on the first, second and third stages of the data storage section 111. And "0" is stored on each of the three associated stages of the end mark storage section 112. This means that each of the data stored on the data storage section 111 is valid. On the fourth stage of the end mark storage section 112, an end mark "1" is stored, which means that data stored on the associated stage and higher-level stages of the data storage section 111 are invalid.

In this case, a single data unit is output by shifting the data on the first stage of the data storage section 111 downward by one stage. For example, as can be seen from the FIFO memory 11 shown at the center of FIG. 10(a), when the data "0" on the first stage is output from the memory 11, each of the data "8" and "4" and the end mark "1" is shifted downward by one stage. Thereafter, when two data units "2" and "1" are input to the data storage section 111, these data units are stored on the third and fourth stages of the data storage section 111, respectively, and the end mark "1" is shifted upward by two stages to be stored on the overflow section 113 as shown on the right-hand side of FIG. 10(a).

If another data is input to the data storage section 111 after the end mark "1" has been stored on the overflow section 113, then the end mark "1" is written on the overflow section 113 again and no data will be stored on the data storage section 111. On the other hand, if the data "8" is output in this state, then the end mark "1" is shifted to the fourth stage and "0" is written on the overflow section 113.

Figure 10B:
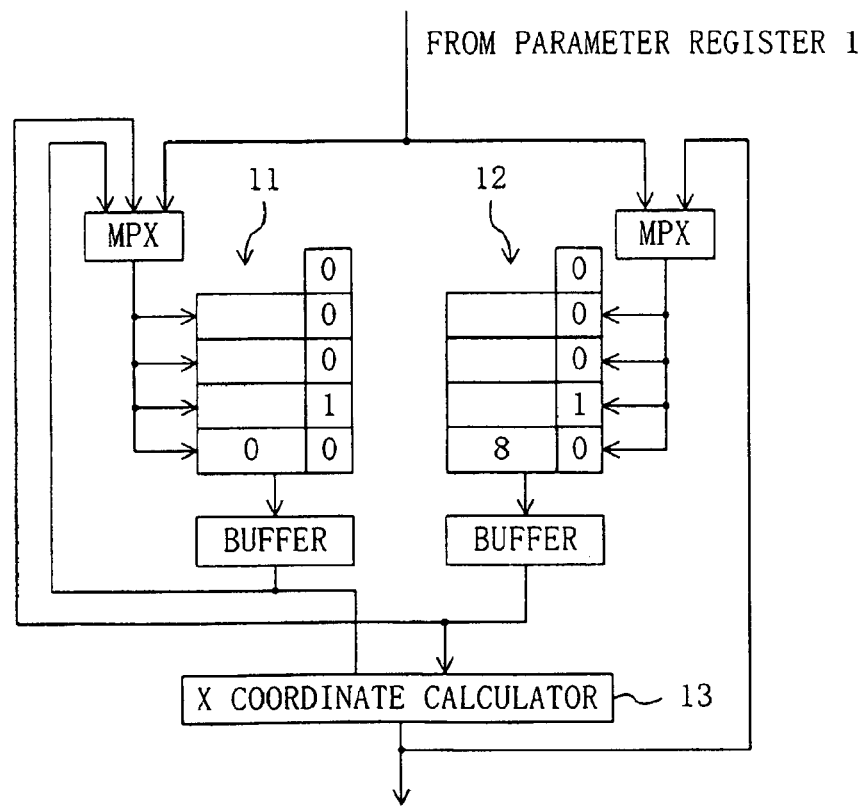
FIG. 10(b) is a block diagram illustrating how data is input and output to/from first and second four-stage FIFO memories for the line-drawing apparatus of the first embodiment.

FIG. 10(b) illustrates the flow of data from the parameter register 1 to the X coordinate calculator 13 through the first and second FIFO memories 11 and 12 with such a configuration. In the illustrated embodiment, the data is input to each of the FIFO memories 11 and 12 via a selector MPX and output from each of the FIFO memories 11 and 12 by way of a buffer.

Hereinafter, specific examples will be described with numerical values actually assigned to the coordinate data.

Figure 11:
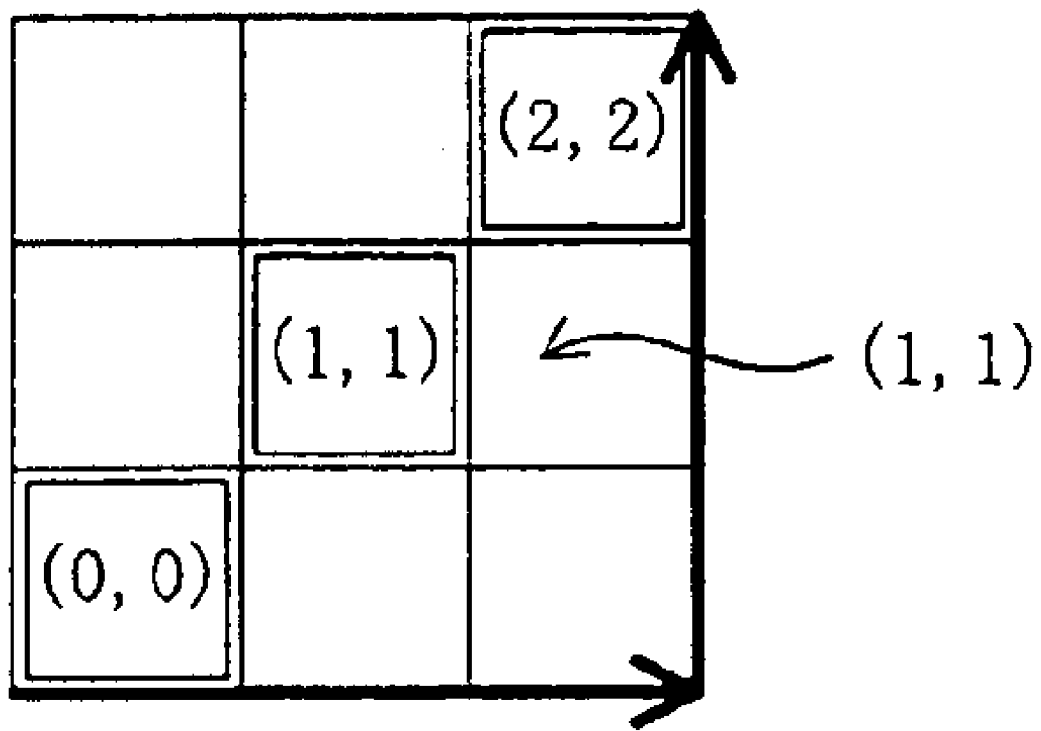
FIG. 11 is a schematic representation illustrating how the line-drawing apparatus of the first embodiment may perform a line-drawing operation for three pixels.

FIG. 11 illustrates an example in which the start and end point coordinate data (Xs, Ys) and (Xe, Ye) are (0, 0) and (2, 2), respectively. As can be easily understood, mid-point coordinate data (1, 1) is generated just by performing to the operation only once for three pixels as shown in FIG. 11.

Figure 12A:
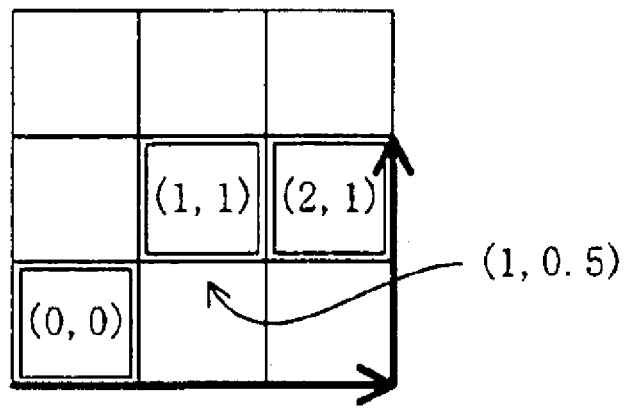
FIGS. 12(a) and 12(b) are schematic representations illustrating how the line-drawing apparatus of the first embodiment may perform a line-drawing operation for three pixels with rounding and truncation adopted, respectively.

FIG. 12(a) illustrates an example in which the start and end point coordinate data (Xs, Ys) and (Xe, Ye) are (0, 0) and (2, 1), respectively. In this case, a decimal point calculation will result in a midpoint with coordinate data (1, 0.5). Thus, the resulting data is raised (or rounded) to generate midpoint coordinate data (1, 1). The rounding operation may be performed by providing below-decimal-point bit domains for the shifter 22 shown in FIG. 3 and by adding one to one bit below the decimal point. Specifically, if the one bit below the decimal point is "0" after shifting, no carries will be caused. Alternatively, if the one bit is "1", carries will be caused and 0.5 will be raised to 1.

Figure 12B:
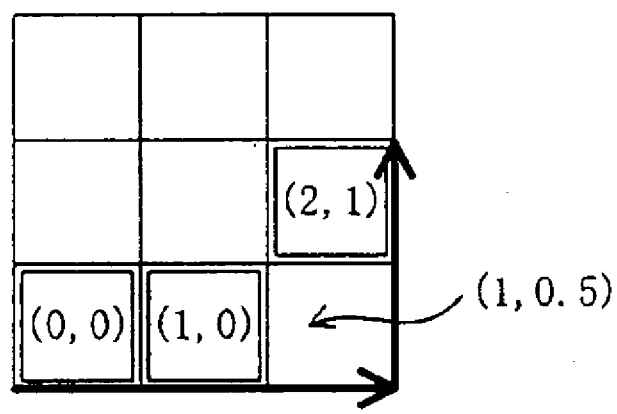

On the other hand, FIG. 12(b) illustrates an example in which the calculated data (1, 0.5) is truncated to generate alternative midpoint coordinate data (1, 0). This data is output when no below-decimal-point bit domains are provided for the shifter 22. That is to say, the shifter 22 shown in FIG. 3 generates this data.

Figure 13A:
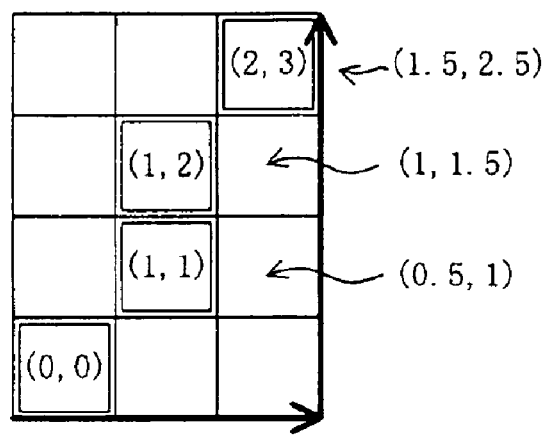
FIGS. 13(a) and 13(b) are schematic representations illustrating how the line-drawing apparatus of the first embodiment may perform a line-drawing operation for four pixels with rounding and truncation adopted, respectively.

FIG. 13(a) illustrates an example in which the start and end point coordinate data (Xs, Ys) and (Xe, Ye) are (0, 0) and (2, 3), respectively. The midpoint coordinate data to be generated step by step will be enumerated below. In the following description, an arithmetic sign "#" means an arithmetic operation of dividing a sum of two data by two. Also, in the following example, data with a decimal fraction is rounded (or raised).

For Start and End Point Coordinates (0, 0) and (2, 3)

Step 1: (0, 0)#(2, 3)→(1, 1.5)→(1, 2)

Step 2: (0, 0)#(1, 2)→(0.5, 1)→(1, 1)

Step 3: (2, 3)#(1, 2)→(1.5, 2.5)→(2, 3).

Figure 13B:
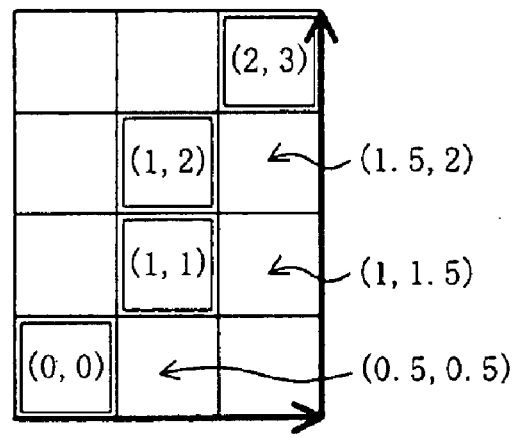

On the other hand, FIG. 13(b) illustrates midpoint coordinate data resulting from truncation.

For Start and End Point Coordinates (0, 0) and (2, 3)

Step 1: (0, 0)#(2, 3)→(1, 1.5)→(1, 1)

Step 2: (0, 0)#(1, 1)→(0.5, 0.5)→(0, 0)

Step 3: (2, 3)→(1, 1)→(1.5, 2)→(1, 2).

As shown in FIGS. 13(a) and 13(b), the same image will be drawn in both of these cases.

In the foregoing embodiment, the X and Y coordinate generators 2 and 3 are separately provided to perform calculation for respective coordinates. However, since X and Y coordinates are mutually independent data, just one of these coordinate generators may be provided and used repeatedly.

As described above, according to this embodiment, a short line can be drawn without performing the division operation of calculating a linear parameter for the line. That is to say, since many clock cycles, which are usually required for the division operation, are not needed, short line drawing can be started while the division cycles are still being executed according to the conventional technique. Thus, 11 the coordinates of a line can be calculated at a higher speed. Particularly when a large number of short lines should be drawn, much more computational process is executable within a predetermined amount of time. As a result, the throughput of the drawing process can be improved considerably.

Also, in the foregoing embodiment, the FIFO memories are used for storing data to be passed to the X coordinate calculator 13. Alternatively, any other data storage means may be used instead of the FIFO memories so long as the storage means can pass the same data as the stored one.

Modified Example of Embodiment 1

Hereinafter, a method using a fixed memory instead of the FIFO memories will be described as a modified example of the first embodiment.

FIG. 14(a) schematically illustrates a fixed memory for storing thereon the data to be passed to the X coordinate calculator 13. The fixed memory 45, i.e., exemplary data storage means as defined in the claims, has its number of stages determined in advance by the longer-side value of a line to be drawn by the line-drawing apparatus. For example, if the longer-side value is 9, then a data storage section with nine stages is needed as shown in FIG. 14(a). If the longer-side value is 17, then a storage section with 17 stages is needed. That is to say, supposing the method using an FIFO memory needs a storage section with a number m of stages (where m is a positive integer), the method using a fixed memory needs a storage section with a number m+1 stages. However, the fixed memory 45 is implementable as a single block, whereas the method using the FIFO memories needs two blocks.

FIG. 14(b) illustrates the order in which the coordinate data should be stored on the fixed memory 45. First, the storage areas for the start and end points 1 and 9 of a line to be drawn are determined. In the illustrated example, the coordinate data of the start and end points 1 and 9 are stored on the data storage areas A1 and A9, respectively.

Next, the X coordinate calculator 13, including the adder 21 and the shifter 22 shown in FIG. 2, performs the addition and the divide-by-two operation to obtain the coordinate data of the first midpoint 5 between the start and end points 1 and 9 and store the data on the data storage area A5. Subsequently, following the order of calculation shown in FIG. 14(b), the data of the second midpoint 3 between the start point 1 and the first midpoint 5 is stored on the data storage area A3 and then a similar operation will be performed sequentially. In FIG. 14(b), (A5) denotes the data stored on the data storage area A5.

By repeatedly performing this operation seven times for the line with a longer-side value of 9, the coordinate data (A2) through (A8) for all of the seven midpoints can be obtained.

The coordinate data of the midpoints do not have to be calculated in the order shown in FIG. 14(b), but may be calculated in any arbitrary order so long as the coordinate data already obtained is used. In the illustrated example, the data storage areas A1 through A9 of the fixed memory 45 are arranged in the ascending or descending order of the addresses for the memory (i.e., from the start point toward the end point). However, the data storage areas A1 through A9 may be arranged in any order so long as one-to-one correspondence is established between the data obtained and their storage areas. Furthermore, each pair of data storage areas does not have to be adjacent to each other.

In the method using the fixed memory according to this modified example, even if the longer-side value is 5, the operation shown in FIG. 14(b) can be performed without changing the control-method in any way as shown in FIG. 14(c). In this case, the data stored on the data storage areas A9 and A8 have the same value and the same image will be drawn twice. However, there will be no problems in the line drawing process itself. In this modified example, the same amount of time is needed for each of the longer-side values of 3 through 9.

As can be seen, according to this modified example, the control can be simplified compared to the method using the FIFO memories, because the same method is applicable to the calculation of midpoints and the memory is fixed.

Embodiment 2

Next, a second embodiment of the present invention will be described with reference to the accompanying drawings.

Figure 15:
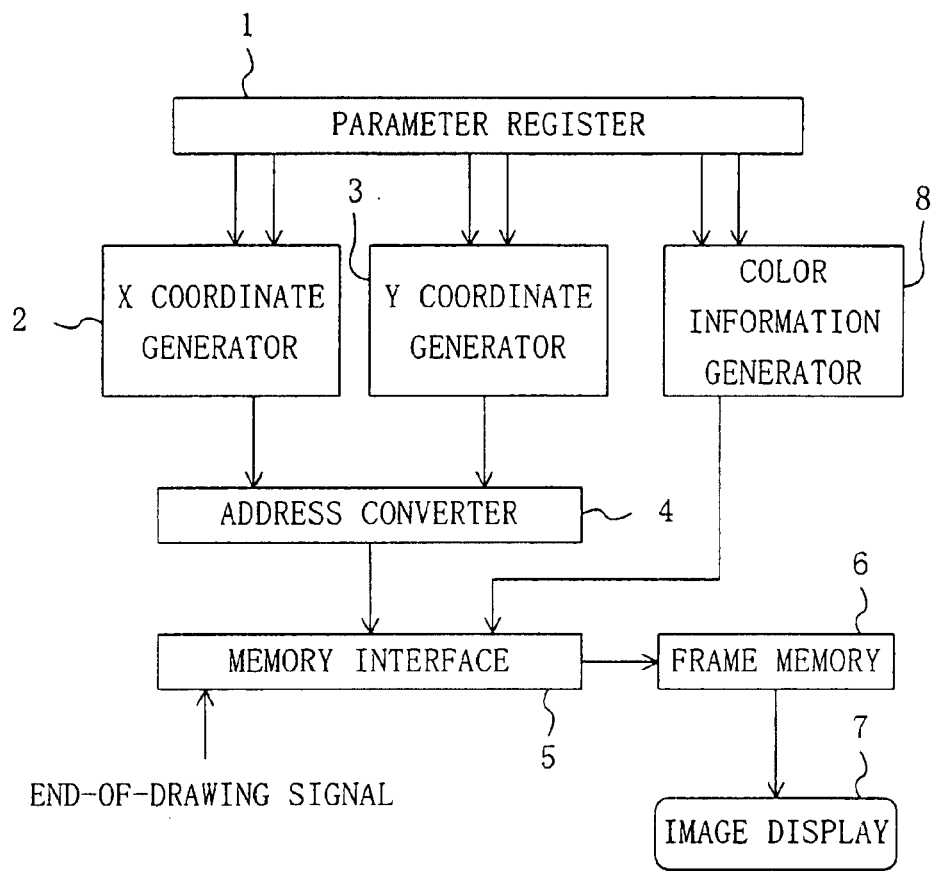
FIG. 15 is a schematic block diagram illustrating a line-drawing apparatus according to a second embodiment of the present invention.

FIG. 15 illustrates a configuration for a line-drawing apparatus of the second embodiment. In FIG. 15, the same components as those illustrated in FIG. 1 will be identified by the same reference numerals and the description thereof will be omitted herein. As shown in FIG. 15, this apparatus further includes a color information generator 8, which has a similar configuration to that of the X and Y coordinate generators 2 and 3, between the parameter register 1 and the memory interface 5.

The line-drawing apparatus of the second embodiment can perform color interpolation on a line connecting start and end points where color information is added to the coordinate data representing the line including the start and end points.

Hereinafter, it will be described how the line-drawing apparatus with such a configuration operates.

In FIG. 15, first, start and end point coordinate data, to which respective color data values have been as-signed, are stored on the parameter register 1.

Next, as in the first embodiment, the X and Y coordinates of the start and end point coordinate data are input to is the X and Y coordinate generators 2 and 3. Then, the operation is performed a predetermined number of times to obtain the coordinate data representing the first, second, third midpoints and so on, which are subsequently output to the address converter 4. In parallel with this operation, the color data values of the start and end point coordinate data are input to the color information generator 8. As in the coordinate computation, the color information generator 8 adds together the numerical values representing the colors of the start and end points and divides the sum by two, thereby outputting a piece of color interpolation information. Accordingly, the color information generator 8 may have the same configuration as the X coordinate generator 2 shown in FIG. 2. That is to say, in this case, the first and second FIFO memories 11 and 12, adder 21 and shifter 22 function as first and second color data storage means, color data adding means and color data divide-by-two means, respectively.

The interpolation information, which has been generated by the color information generator 8, is combined with its associated coordinate data in the frame memory 6. Then, a pixel in the specified color is drawn on the image display 7.

Figure 16:
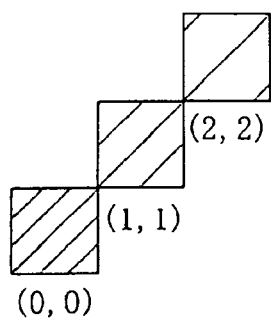
FIG. 16 is a schematic representation illustrating an exemplary graded line drawn with their colors interpolated by the line-drawing apparatus of the second embodiment.

FIG. 16 illustrates an exemplary line that has been a, drawn with various gradations, or with its colors interpolated. As used herein, the "gradation" refers to gradual change in colors of separately located, discrete objects with the interpolation. As shown in FIG. 16, the midpoint with the coordinates (1, 1) between the dark-colored start point with the coordinates (0, 0) and the light-colored end point with the coordinates (2, 2) has color data representing an intermediate color between them.

Figure 17:
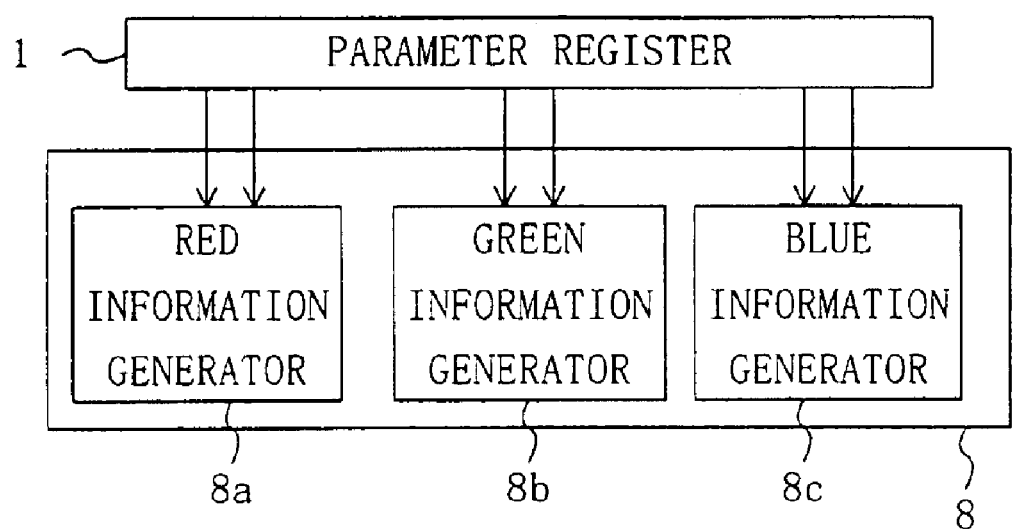
FIG. 17 is a schematic block diagram illustrating a modified example of a color information generator in the line-drawing apparatus of the second embodiment.

FIG. 17 illustrates a modified example of the color information generator S.

The color information generator 8 shown in FIG. 17 includes red, green and blue information generators 8a, 8b and 8c, each having the same configuration as that of the X coordinate generator 2. Thus, if the color information is represented in terms of data for the three primary colors of red, green and blue, this apparatus can perform color interpolation with even higher precision.

As described above, the apparatus according to this embodiment uses no dividers, which are usually needed in a conventional apparatus and adversely increase the computational costs, even in drawing a short line that should have some gradation. Thus, the apparatus can draw such a line at a higher speed with its hardware configuration simplified.

If the number of FIFO stages is relatively small, the single color information generator 8 may be used in common for obtaining respective data for red, green and blue.

Embodiment 3

Next, a third embodiment of the present invention will be described with reference to the accompanying drawings.

Figure 18:
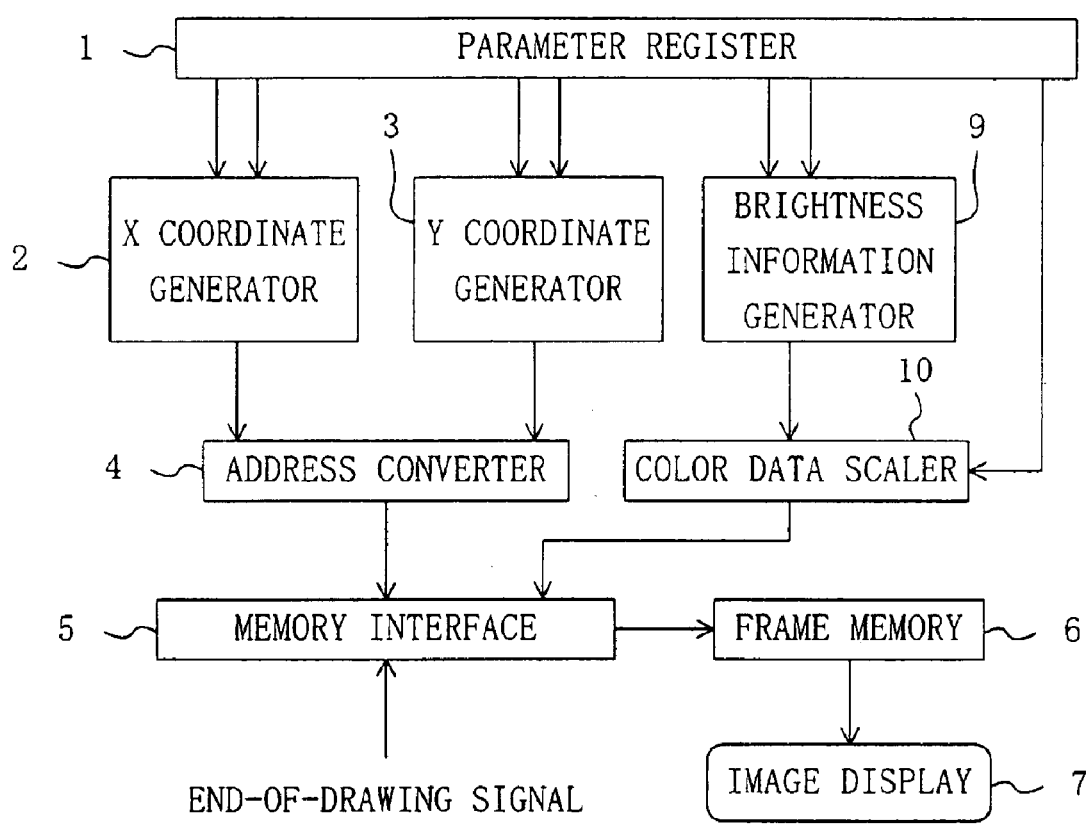
FIG. 18 is a schematic block diagram illustrating a line-drawing apparatus according to a third embodiment of the present invention.

FIG. 18 illustrates a configuration for a line-drawing apparatus of the third embodiment. In FIG. 18, the same components as those illustrated in FIG. 1 will be identified by the same reference numerals and the description thereof will be omitted herein. As shown in FIG. 18, this apparatus further includes brightness information generator 9 and color data scaler 10 between the parameter register 1 and the memory interface 5. The brightness information generator 9 has a similar configuration to that of the X and Y coordinate generators 2 and 3. The color data scaler 10 receives the output of the brightness information generator 9, performs color data scaling with reference to the brightness data and then outputs the scaled information to the memory interface 5.

The line-drawing apparatus of the third embodiment can perform brightness interpolation on a line connecting start and end points where brightness (or luminance) information is added to the coordinate data representing the line including the start and end points.

Hereinafter, it will be described how the line-drawing apparatus with such a configuration operates.

In FIG. 18, first, start and end point coordinate data, to which respective brightness data values have been assigned, are stored on the parameter register 1.

Next, as in the first embodiment, the X and Y coordinates of the start and end point coordinate data are input to the X and Y coordinate generators 2 and 3. Then, the operation is performed a predetermined number of times to obtain the coordinate data representing the first, second, third midpoints and so on, which are subsequently output to the address converter 4. In parallel with this operation, the brightness data values of the start and end point coordinate data are input to the brightness information generator 9. As in the coordinate computation, the brightness information generator 9 adds together the numerical values representing the brightness of the start and end points and divides the sum by two, thereby outputting a piece of brightness interpolation information. Accordingly, the brightness information generator 9 may have the same configuration as the X coordinate generator 2 shown in FIG. 2. That is to say, in this case, the first and second FIFO memories 11 and 12, adder 21 and shifter 22 function as first and second brightness data storage means, brightness data adding means and brightness data divide-by-two means, respectively.

Next, the brightness data generated is input to the color data scaler 10, which performs color data scaling with reference to the brightness data. In this case, the scaling is performed by regarding brightness values 0 and 1 as representing relatively dark and relatively bright colors, respectively. Accordingly, if a line to be drawn has start and end points with respective brightness values 0 and 1, then the brightness of its midpoint will calculate as 0.5. By integrating this value with the color data, brightness-indexed color data can be obtained.

Then, the brightness-indexed color interpolation information, which has been generated by the color data scaler 10, is combined with its associated coordinate data in the frame memory 6. Then, a pixel in the specified color and with the specified brightness is drawn on the image display 7.

As described above, the apparatus according to this embodiment uses no dividers, which are usually needed in a conventional apparatus and adversely increase the computational costs, even in drawing a short line that should be provided with some gradation in accordance with brightness-indexed col- or information. Thus, the apparatus can draw such a line at a higher speed with its hardware configuration simplified.

In the foregoing embodiment, a single piece of color information is associated with multiple brightness data values. Alternatively, those brightness data values may be defined for each of the three primary colors as in the modified example of the second embodiment.

Optionally, the brightness information generator 9 and the color data scaler 10 of the third embodiment may also be added to the line-drawing apparatus of the second embodiment. In such an embodiment, the line-drawing apparatus can perform both brightness and color interpolations in drawing a line.

Embodiment 4

Next, a fourth embodiment of the present invention will be described with reference to the accompanying drawings.

Figure 19:
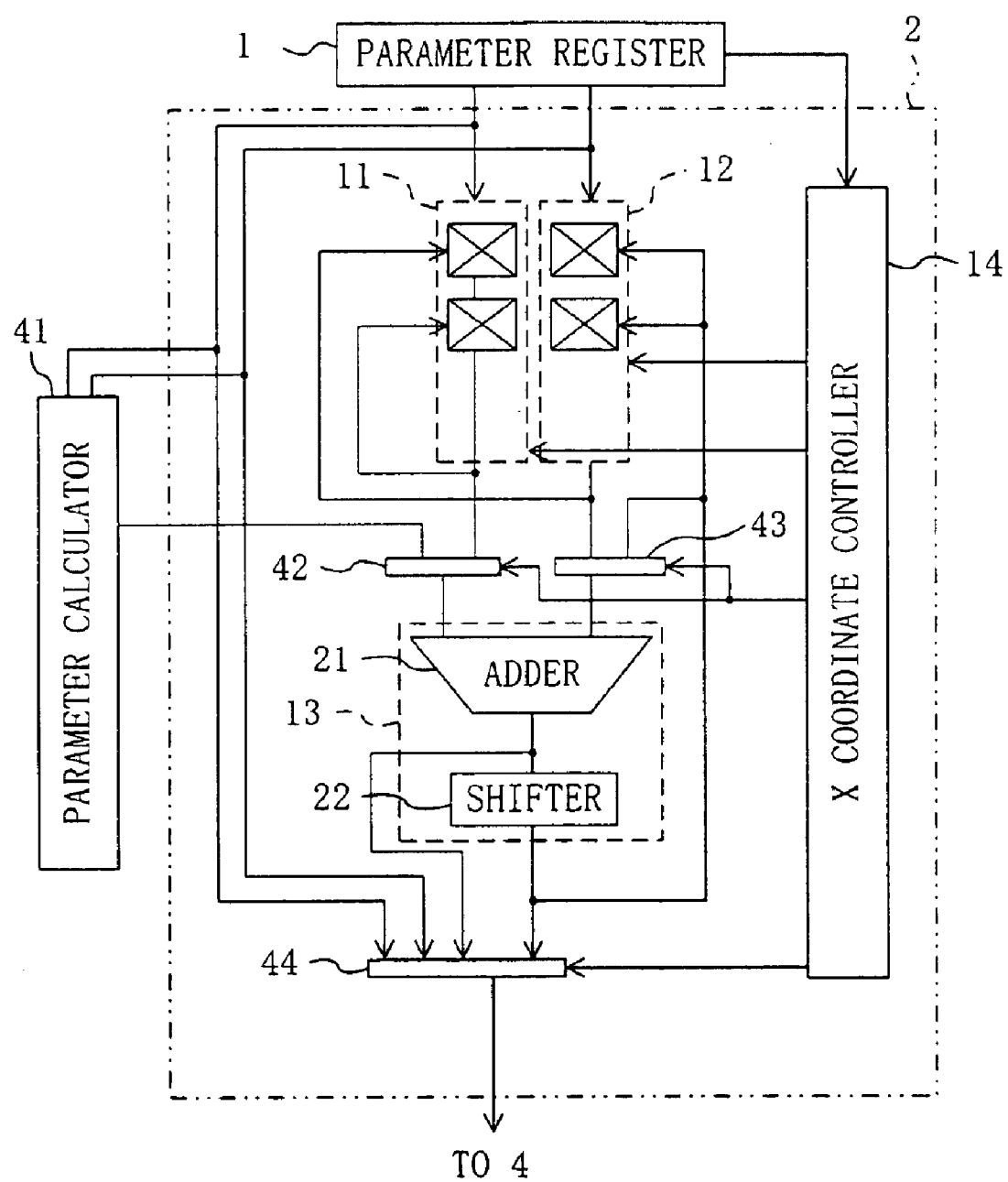
FIG. 19 is a block diagram illustrating a parameter calculator and the details of an X coordinate generator for a line-drawing apparatus according to a fourth embodiment of the present invention.

FIG. 19 illustrates a detailed configuration for an X coordinate generator in a line-drawing apparatus of the fourth embodiment. In FIG. 19, the same components as those illustrated in FIG. 2 will be identified by the same reference numerals and the description thereof will be omitted herein.

The line-drawing apparatus according to any of the foregoing embodiments is adapted to draw a short line as a collection of points within a predetermined amount of time. In contrast, the line-drawing apparatus of the fourth embodiment takes advantage of the conventional method of calculating a linear parameter representing the slope of a line to be drawn. Specifically, the line-drawing apparatus of this embodiment selectively adopts the method of generating multiple midpoints successively or the conventional method of calculating the linear parameter depending on the longer-side value (i.e., the number of pixels).

As shown in FIG. 19, the line-drawing apparatus further includes a parameter calculator 41. The parameter calculator 41 receives the start and end point coordinate data from the parameter register 1, calculates the slope of a line including the start and end points represented by the coordinate data received and then outputs the slope to the X coordinate calculator 13.

The X coordinate generator 2 further includes first, second and third selectors 42, 43 and 44 implemented as the first, second and third selecting means as defined in the appended claims. The first selector 42 receives the output values of the first FIFO memory 11 and the parameter calculator 41 and selectively outputs one of these values to the X coordinate calculator 13. The second selector 43 receives the output values of the second FIFO memory 12 and the X coordinate calculator 13 and selectively outputs one of these values to the X coordinate calculator 13. And the third selector 44 receives the respective output values of the parameter register 1, adder 21 and shifter 22 and selectively outputs one of these values to the address converter 4.

Figure 20:
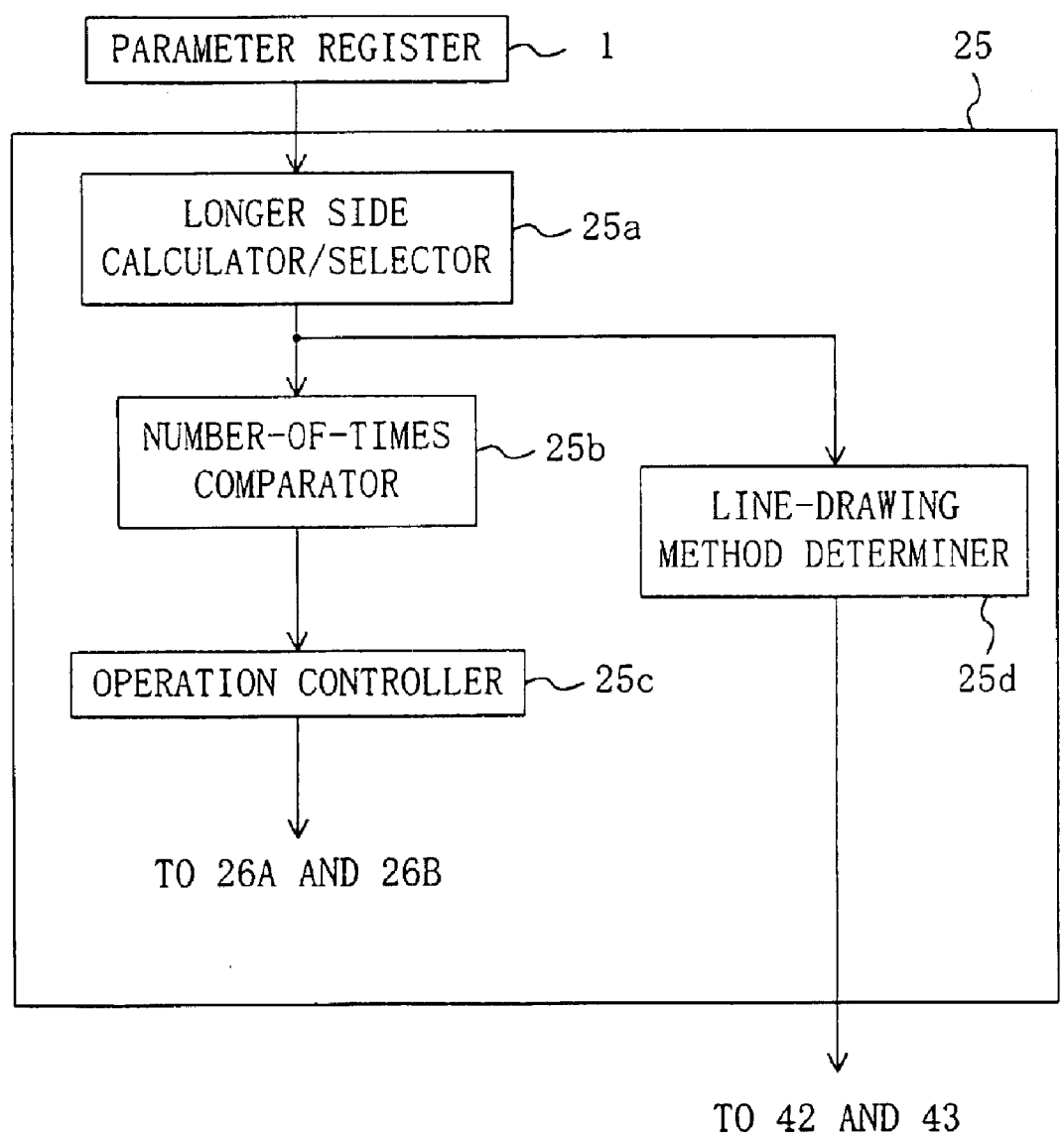
FIG. 20 is a block diagram illustrating the details of an iterative number regulator for the line-drawing apparatus of the fourth embodiment.

FIG. 20 illustrates a detailed configuration for an iterative number regulator 25 in the X coordinate controller 14 according to the fourth embodiment. In FIG. 20, the same components as those illustrated in FIG. 5 will be identified by the same reference numerals and the description thereof will be omitted herein. As shown in FIG. 20, the iterative number regulator 25 further includes a line-drawing method determiner 25d. The line-drawing method determiner 25d receives the output of the longer side calculator/selector 25a and determines whether or not the absolute value of the difference between X or Y coordinates of the start and midpoint coordinate data exceeds a predetermined value. If the absolute value is greater than the predetermined value, then the line-drawing method determiner 25d generates and outputs a line-drawing method determination signal to the first and second selectors 42 and 43 such that the output of the parameter calculator 41 is selected.

Hereinafter, it will be described how the line-drawing apparatus with such a configuration operates.

In drawing a short line, the line-drawing apparatus operates just as described in the first embodiment. On the other hand, in drawing a long line, the line-drawing apparatus adopts the conventional line-drawing method. Thus, it will be mainly described with reference to the processing flow shown in FIG. 21 how the iterative number regulator 25 shown in FIG. 20 determines which of the long and short line drawing methods should be taken.

Figure 21:
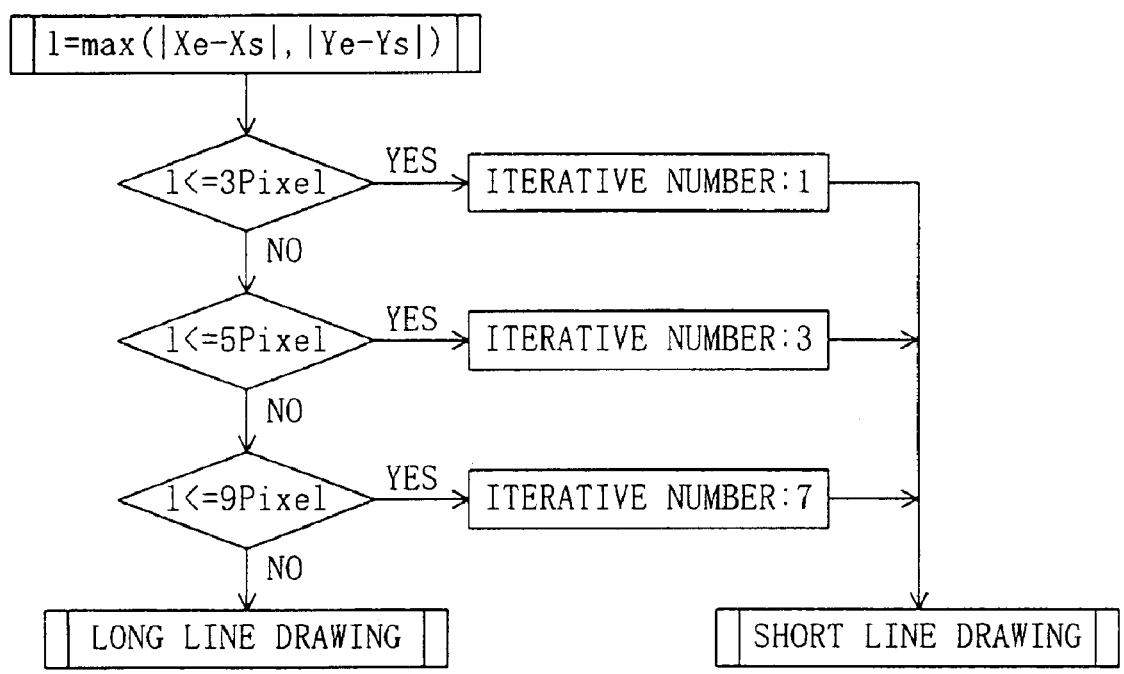
FIG. 21 is a flowchart illustrating how the iterative number regulator may determine the number of times the line-drawing apparatus should perform the operation according to the fourth embodiment.

FIG. 21 is a flowchart illustrating how the iterative number regulator 25 determines the line-drawing method to take according to the fourth embodiment.

First, the longer side calculator/selector 25a performs a longer side calculation and selection process shown in FIG. 21. Specifically, supposing the coordinate data representing the start and end points to be drawn are (Xs, Ys) and (Xe, Ye), respectively, the longer side calculator/selector 25 obtains the respective absolute values of the difference between the X coordinates (|Xe−Xs|) and the difference between the Y coordinates (|Ye−Ys|) for the start and end points and outputs one of these differences with the greater absolute value.

Next, the line-drawing method determiner 25d determines whether or not the absolute value, output from the longer side calculator/selector 25a, is greater than a predetermined longer-side value (or the predetermined number of pixels). Suppose the absolute value is greater than a longer-side value of 9, for example. In such a case, the determiner 25d makes the first selector 42 select the output signal of the parameter calculator 41 and makes the second selector 43 select the output signal of the X coordinate calculator 13. And the determiner 25d outputs a line-drawing method determination signal, which disables the output signal of the shifter 22, to the third selector 44. Alternatively, if the absolute value is equal to or less than the nine-pixel-equivalent value, the determiner 25d makes the first and second selectors 42 and 43 select the output signals of the first and second FIFO memories 11 and 12, respectively. And the determiner 25d outputs a line-drawing method determination signal, which disables the output signal of the adder 21, to the third selector 44.

Subsequently, the number-of-times comparator 25b shown in FIG. 20 determines, based on the data provided from the longer side calculator/selector 25a, how many times the operation should be performed. Supposing the iterative number determination table shown in Table 2 is used, if the number of pixels is three or less, then the operation should be performed just once as-shown in FIG. 21. Using the same table, the operation will be performed three and seven times, respectively, for five pixels or less and nine pixels or less, respectively.

By providing the line-drawing method determiner 25d, parameter calculator 41 and selectors 42, 43 and 44, a long line can be drawn just as intended if the number of pixels is nine or more.

The line-drawing method determiner 25d may also be connected to receive the output of the number-of-times comparator 25b. In such an embodiment, there is no need to perform the process of determining whether the output of the longer side calculator/selector 25a exceeds a predetermined value such that the long line drawing method is adopted for nine pixels or more.

As described above, the line-drawing apparatus of the fourth embodiment can generate coordinates for any line using the same computational resource, i.e., the adder 21 in this case, no matter whether the line to be drawn is long or short. Thus, even when short and long lines both should be drawn, a hardware resource can be shared without providing any additional adder 8.

Moreover, in drawing a short line, there is no need to perform the division operation using the difference of X coordinates, which is required in drawing a long line. Thus, compared to the conventional technique, coordinates for a short line can be obtained faster and the overall throughput of the line-drawing process can be improved.

In the foregoing embodiment, the "short line" is supposed to correspond to nine pixels or less. However, the present invention is not limited to this specific value.

Accordingly, although the number of FIFO stages is four in the foregoing embodiments, the number does not have to be four. Instead, as can be seen from the relationship shown in Table 1 between the number of FIFO stages and the longer-side value, any other appropriate number may be selected for a line to be drawn.

Embodiment 5

Hereinafter, a fifth embodiment of the present invention will be described with reference to the accompanying drawings.

In the foregoing fourth embodiment, the conventional line-drawing method using a linear parameter is adopted to draw a long line. In this fifth embodiment, the long line to be drawn is once divided into a plurality of short lines and then those short lines divided are drawn one after another.

Figure 22:
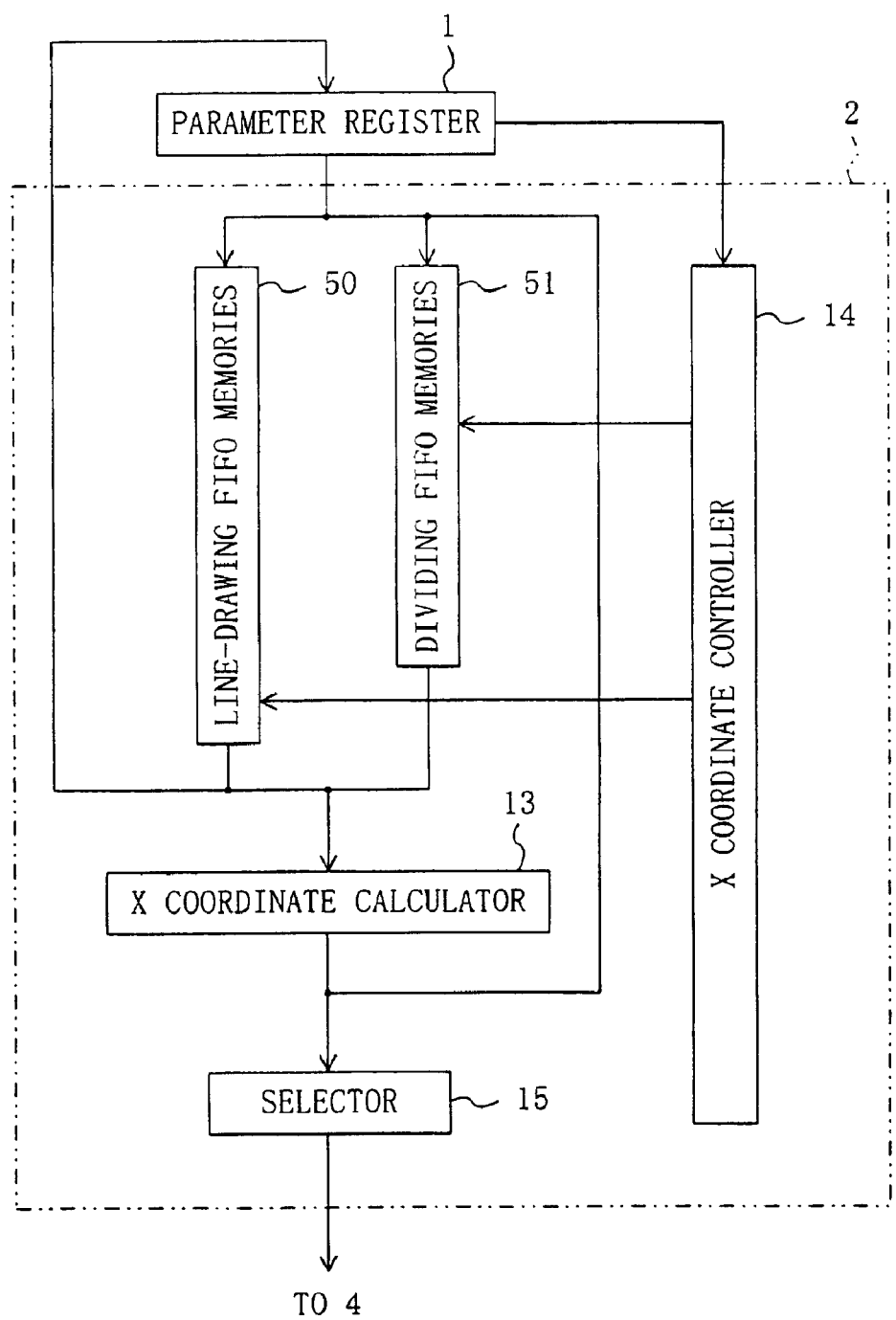
FIG. 22 is a block diagram illustrating the details of an X coordinate generator for a line-drawing apparatus according to a fifth embodiment of the present invention.

FIG. 22 illustrates a configuration for an X coordinate generator 2 for the line-drawing apparatus of the fifth embodiment. In FIG. 22, the same components as those of the X coordinate generator 2 of the first embodiment shown in FIG. 2 are identified by the same reference numerals and the description thereof will be omitted herein. As shown in FIG. 22, the X coordinate generator 2 of the fifth embodiment includes line-drawing FIFO memories 50 and dividing FIFO memories 51. The line-drawing FIFO memories 50 include the first and second FIFO memories 11 and 12 shown in FIG. 2. The dividing FIFO memories 51 are connected in parallel to the line-drawing FIFO memories 50 and include memories with a function equivalent to that of the first and second FIFO memories 11 and 12. Although not shown in FIG. 22, the dividing FIFO memories 51 are also provided for the Y coordinate generator.

Next, it will be described how to divide a long line.

Figure 23A:
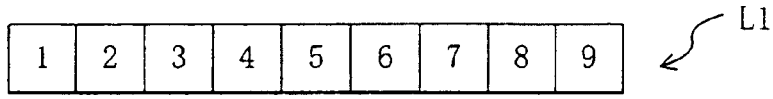
FIGS. 23(a) through 23(c) are schematic representations illustrating how to divide a long line into multiple short lines according to the fifth embodiment.
Figure 23B:
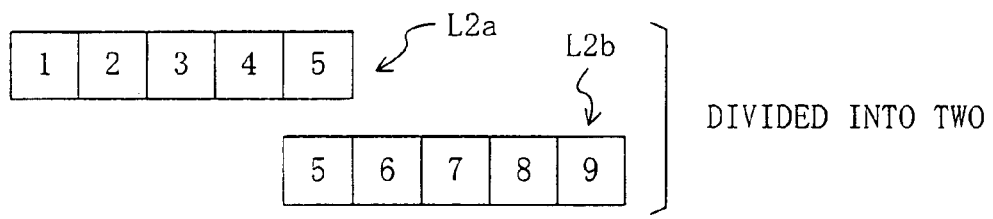

FIG. 23(a) illustrates a long line L1 to be drawn with a longer-side value of 9. As shown in Table 1, if the number of FIFO stages of each of the line-drawing FIFO memories 50 is four, then the longer-side value of the long line to be drawn is 5. In that case, the dividing FIFO memories 51 divide this long line L1 into two, thereby generating first and second short lines L2a and L2b as shown in FIG. 23(b). Specifically, the first short line L2a starts at "1" and ends at "5", while the second short line L2b starts at "5" and ends at "9".

Figure 23C:
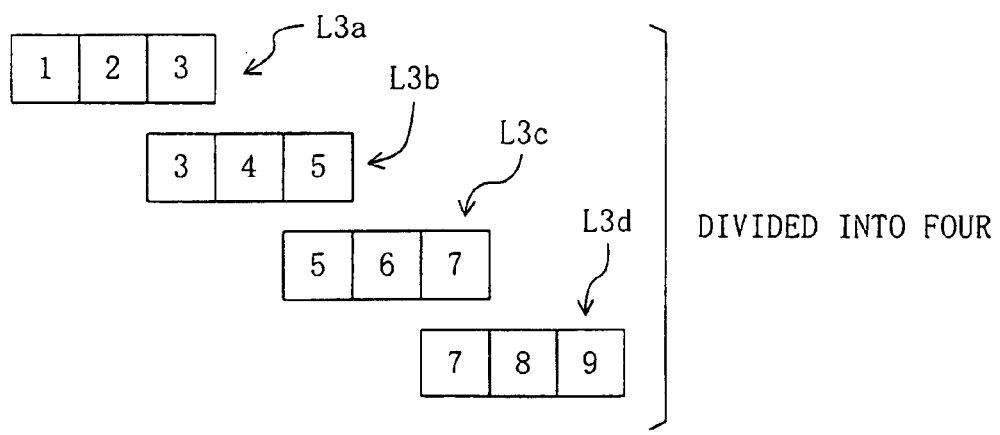

On the other hand, if the number of FIFO stages of each of the line-drawing FIFO memories 50 is two, then the longer-side value of the long line to be drawn is 3. In that case, the dividing FIFO memories 51 divide the long line L1 into four, thereby generating first, second, third and fourth short lines L3a, L3b, L3c and L3d as shown in FIG. 23(c). Specifically, the first short line L3a starts at "1" and ends at "3", the second short line L3b starts at "3" and ends at "5", the third short line L3c starts at "5" and ends at "7" and the fourth short line L3d starts at "7" and ends at "9".

The following Table 3 is an example of a more practical division number determination table:

TABLE 3

| Longer-side value | Division Number | Number of times of Divide-by-two operation |
|---|---|---|
| 3 through 33 | 1 | 0 |
| 34 through 65 | 2 | 1 |
| 66 through 129 | 4 | 3 |
| 130 through 257 | 8 | 7 |

As can be seen from Table 3, if the longer-side value is up to 33 (i.e., if the number of stages of the line-drawing FIFO memories 50 is 32 or less), then no divide-by-two operations need to be performed. It can also be seen that this method is applicable to any long line with a longer-side value of 257 or less.

Figure 24:
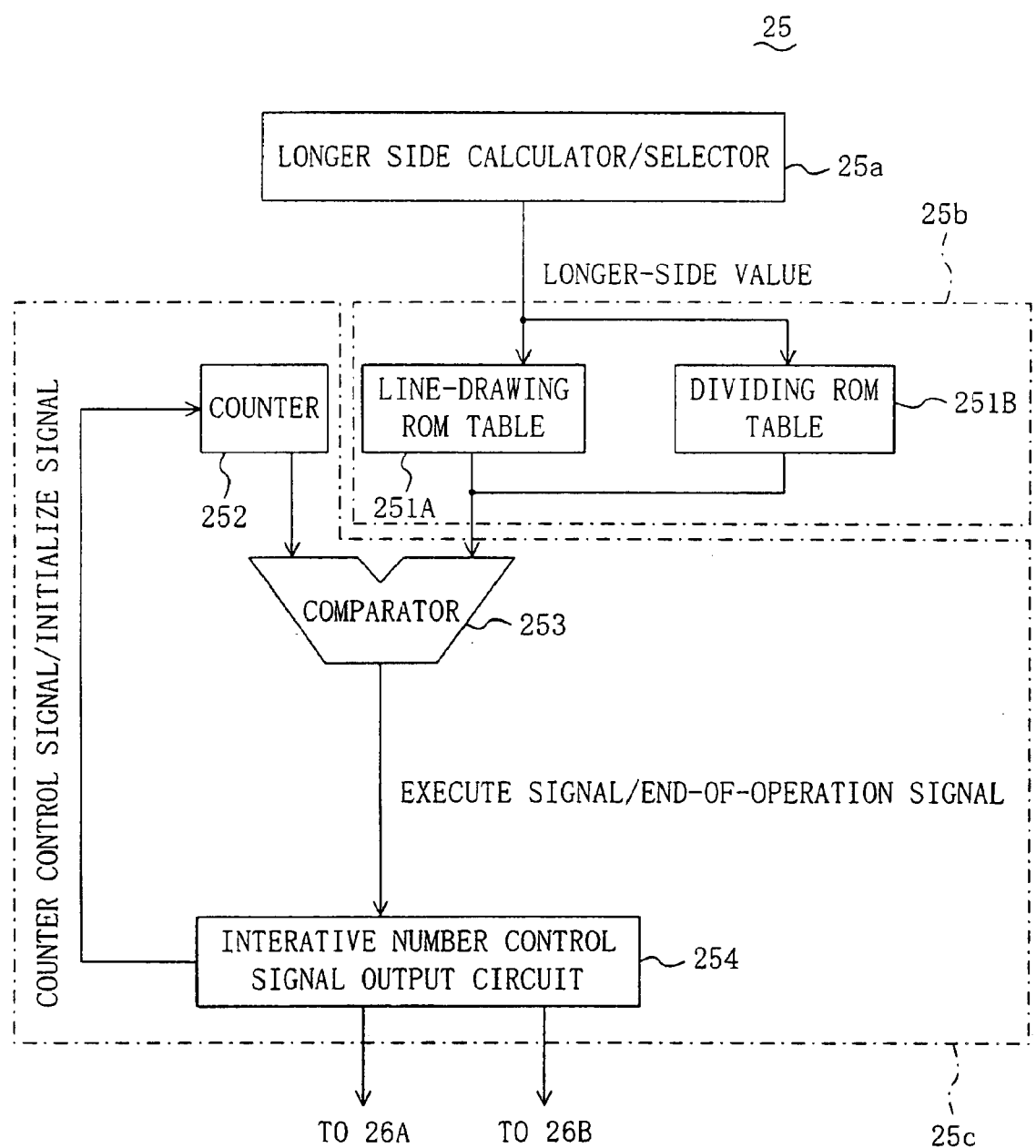
FIG. 24 is a block diagram illustrating the details of a number-of-times comparator for the line-drawing apparatus of the fifth embodiment.
Figure 25:
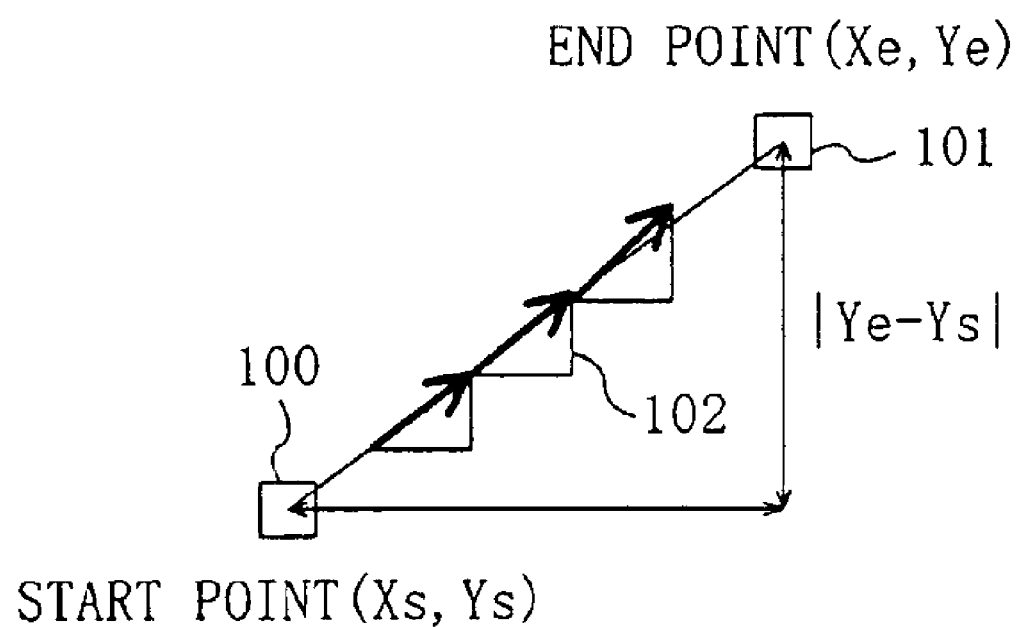
FIG. 25 is a schematic representation illustrating a known line-drawing method.
Figure 26:
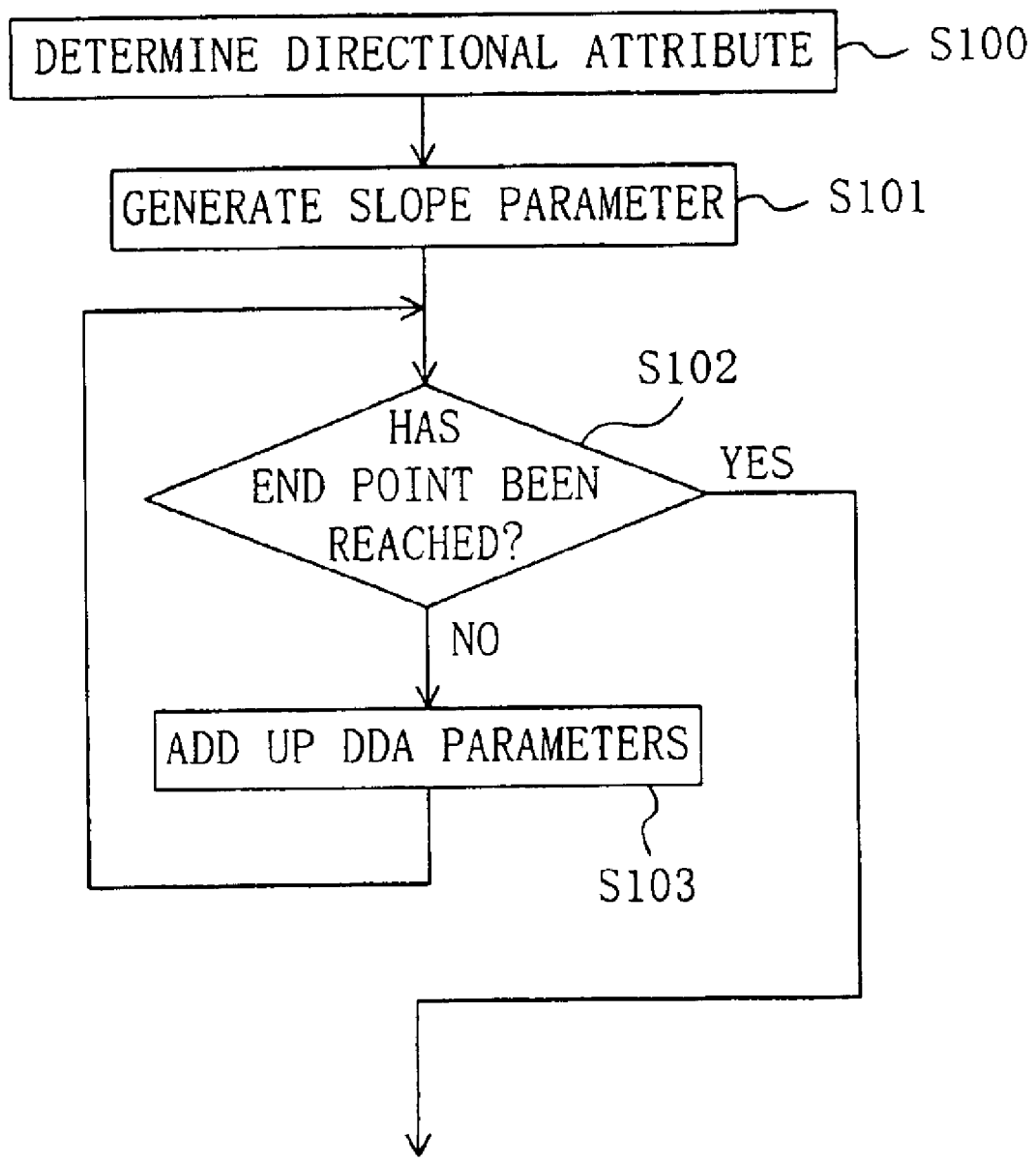
FIG. 26 is a flowchart illustrating respective process steps of the known line-drawing method.

FIG. 24 illustrates a configuration for a number-of-times comparator 25b including the division number determination table. In FIG. 24, the same components as those illustrated in FIG. 6 are identified by the same reference numerals. As shown in FIG. 24, the number-of-times comparator 25b of the fifth embodiment includes line-drawing ROM table 251A and dividing ROM table 251B. The line-drawing ROM table 251A is used for determining the number of times the line-drawing operation should be performed to draw short lines. On the other hand, the dividing ROM table 251B is used for determining the number of times the divide-by-two operation should be performed to divide the long line into short lines.

In this manner, according to the fifth embodiment, a long line is repeatedly divided in advance into short lines by the same method as that used to draw a short line until each of the short lines can be drawn. And then these short lines divided are drawn one after another. Accordingly, even a long line with a longer-side value exceeding that determined by the number of FIFO stages of the dividing FIFO memories 51 can be drawn without using the linear parameters. In addition, the long line L1 is divided at its midpoint as is done in each embodiment of the present invention. Thus, just by providing the dividing FIFO memories 51 in parallel to the line-drawing FIFO memories 50 and adding the dividing ROM table 251B, the other circuits and hardware resources can be shared. As a result, the line-drawing apparatus can have a simpler configuration.

Also, multiple line-drawing apparatuses of the first embodiment may be prepared. In that case, after a long line to be drawn has been divided into a plurality of short lines that can be drawn by these apparatuses, those short lines may be drawn by the same number of line-drawing apparatuses in parallel. In this manner, the long line can be drawn in a much shorter time.

As for a line with a longer-side value greater than 257, the conventional method of drawing a line using its linear parameter may be additionally adopted as in the fourth embodiment.

What is claimed is:

1. An apparatus for drawing a line connecting a start point to an end point, the start and end points both being presented on display means and being represented by mutually different sets of coordinates, the apparatus comprising:

first and second data storage means, each said storage means accepting a plurality of input coordinate data and sequentially outputting one item of these data after another on a first in, first out basis;

adding means for receiving and adding together the respective coordinate data output from the first and second data storage means and outputting added data; and divide-by-two means for dividing the added data by two and outputting divided data, wherein the coordinate data output from the first and second data storage means are input to the first data storage means, and wherein the divided data is input from the divide-by-two means to the second storage means, and wherein the line connecting the start and end points together is drawn on the display means in accordance with the divided data output from the divide-by-two means.

2. The apparatus of claim 1, wherein the divide-by-two means is a shifter that is so interconnected as to shift the added data to the right by one bit.

3. The apparatus of claim 1, further comprising iteration control means for regulating the number of times the output data is fed back to the first and second storage means, wherein the iteration control means includes:

a longer side calculator/selector for calculating respective absolute values of a difference between X coordinates and a difference between Y coordinates of the start and end points and for outputting one of these two differences that has the greater absolute value; and a number-of-times comparator for determining, by the absolute value, the number of times the output should be fed back.

4. The apparatus of claim 1, further comprising:

first and second color data storage means, each said color data storage means accepting a plurality of input color data and sequentially outputting one of the data after another on a first in, first out basis;

color data adding means for receiving and adding together the respective color data output from the first and second color data storage means and outputting added color data; and color data divide-by-two means for dividing the added color data by two and outputting divided color data, wherein the color data, which are output from the first and second color data storage means and correspond to the start and end points, respectively, are input to the first color data storage means, and wherein the divided color data, output from the color data divide-by-two means, is input to the second color data storage means, and wherein the color of the line connecting the start and end points together is determined in accordance with the divided color data.

5. The apparatus of claim 1, further comprising:

first and second brightness data storage means, each said brightness data storage means accepting a plurality of input brightness data and sequentially outputting one of the data after another on a first in, first out basis;

brightness data adding means for receiving and adding together the respective brightness data output from the first and second brightness data storage means and outputting added brightness data; and brightness data divide-by-two means for dividing the added brightness data by two and outputting divided brightness data, wherein the brightness data, which are output from the first and second brightness data storage means and correspond to the start and end points, respectively, are input to the first brightness data storage means, and wherein the divided brightness data, output from the brightness data divide-by-two means, is input to the second brightness data storage means, and wherein the brightness of the line connecting the start and end points together is determined in accordance with the divided brightness data.

6. The apparatus of claim 1, further comprising:

linear parameter calculating means for calculating and outputting a linear parameter representing a slope of the line connecting the start and end points together;

first selecting means for receiving the linear parameter and the output data of the first data storage means and selectively outputting either the parameter or the output data of the first data storage means to the adding means; and second selecting means for receiving the divided data and the output data of the second data storage means and selectively outputting either the divided data or the output data of the second data storage means to the adding means.

7. An apparatus for drawing a line connecting a start point to an end point, the start and end points both being presented on display means and being represented by mutually different sets of coordinates, the apparatus comprising:

data storage means with data storage areas on which multiple coordinate data are storable, the coordinate data including first and second coordinate data of the line connecting the start and end points together;

adding means for adding together the first and second coordinate data and outputting added data; and divide-by-two means for dividing the added data by two and outputting divided data, wherein the divided data is stored as third coordinate data on a predetermined one of the data storage areas.

8. The apparatus of claim 7, wherein the adding and divide-by-two means repeatedly perform the addition and the divide-by-two operation for multiple line segments a number of times determined by the number of the data storage areas, each said line segment ending at two adjacent ones of midpoints that correspond to the respective coordinate data, results of the addition and the divide-by-two operation being stored on respectively predetermined ones of the data storage areas.

9. A method for drawing a line connecting a start point to an end point using a line-drawing apparatus, the apparatus including: display means; first and second data storage means of a first in, first out type; adding means for receiving outputs of the first and second data storage means; and divide-by-two means for dividing an output of the adding means by two, the start and end points both being presented on the display means and being represented by mutually different sets of coordinates, the method comprising the steps of:

a) outputting start and end point coordinate data, which represent the start and end points, respectively, to the display means;

b) storing the start and end point coordinate data in the first and second data storage means, respectively;

c) outputting the start point coordinate data from the first data storage means to the adding means and storing the start point coordinate data back to the first storage means concurrently;

d) outputting the end point coordinate data from the second data storage means to the adding means and storing the end point coordinate data on the first storage means concurrently;

e) outputting a sum of the start and end point coordinate data from the adding means to the divide-by-two means; and f) providing output data of the divide-by-two means to the display means and storing the output data of the divide-by-two means on the second data storage means concurrently such that the output data of the divide-by-two means corresponds to the start and end point coordinate data stored in the steps c) and d).

10. An apparatus for drawing a line connecting a start point and end point, the start and end pints both being presented on display means and being represented by mutually different sets of coordinates, the apparatus comprising:

first and second data storage means, each said storage means accepting a plurality of input coordinate data and sequentially outputting one item of these data after another on a first in, first out basis; and midpoint generating means for generating a midpoint coordinate data from the respective coordinate data output from the first and second data storage means and outputting the midpoint coordinate data, wherein the coordinate data output from the first and second data storage means are input to the first data storage means, and wherein the midpoint coordinate data is input from the generating means to the second storage means, and wherein the line connecting the start and end points together is drawn on the display means in accordance with the midpoint coordinate data output from the midpoint generating means.

11. The apparatus of claim 7, further comprising:

color data storage means with color data storage areas on which multiple color data are storable, the color data including first and second color data corresponding to the first and second coordinate data, respectively;

color data adding means for adding together the first and second color data and outputting added color data; and color data divide-by-two means for dividing the added color data by two and outputting divided color data, wherein the divided color data is stored as third color data corresponding to the third coordinate data on a predetermined one of the color data storage areas.

12. The apparatus of claim 7, further comprising:

brightness data storage means with brightness data storage areas on which multiple brightness data are storable, the color data including first and second color data corresponding to the first and second coordinate data, respectively;

brightness data adding means for adding together the first and second brightness data and outputting added brightness data; and brightness data divide-by-two means for dividing the added brightness data by two and outputting divided brightness data, wherein the divided-brightness data is stored as third brightness data corresponding to the third coordinate data on a predetermined one of the brightness data storage areas.

* * * * *